(12) United States Patent
Kurisu

(10) Patent No.: US 10,250,796 B2
(45) Date of Patent: Apr. 2, 2019

(54) FOCUS ADJUSTMENT APPARATUS AND FOCUS ADJUSTMENT METHOD

(71) Applicant: CANON KABUSHIKI KAISHA, Tokyo (JP)

(72) Inventor: Hiroaki Kurisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 15/698,416

(22) Filed: Sep. 7, 2017

(65) Prior Publication Data

US 2018/0077341 A1 Mar. 15, 2018

(30) Foreign Application Priority Data

Sep. 14, 2016 (JP) .................................. 2016-179909

(51) Int. Cl.
*H04N 5/232* (2006.01)
*G02B 7/28* (2006.01)
*H04N 5/357* (2011.01)
*G03B 13/36* (2006.01)

(52) U.S. Cl.
CPC ........... *H04N 5/23212* (2013.01); *G02B 7/28* (2013.01); *H04N 5/3575* (2013.01); *G03B 13/36* (2013.01); *H04N 5/357* (2013.01)

(58) Field of Classification Search
CPC ............................. H04N 5/232122; G02B 7/28
USPC .................................................. 348/345, 349
See application file for complete search history.

(56) References Cited

U.S. PATENT DOCUMENTS

| | | | | |
|---|---|---|---|---|
| 2004/0105673 A1* | 6/2004 | Yoshida | ................. | G03B 13/36 396/128 |
| 2013/0286275 A1* | 10/2013 | Ogawa | ............... | H04N 5/23212 348/345 |
| 2014/0320711 A1* | 10/2014 | Fukuda | .............. | H04N 5/23212 348/294 |
| 2015/0124158 A1* | 5/2015 | Ishii | .................... | H04N 5/23212 348/354 |
| 2016/0198107 A1* | 7/2016 | Yamazaki | ................ | G02B 7/38 348/350 |

FOREIGN PATENT DOCUMENTS

| | | |
|---|---|---|
| JP | 09-054242 A | 2/1997 |
| JP | 2007-052206 A | 3/2007 |

\* cited by examiner

*Primary Examiner* — Anthony J Daniels
(74) *Attorney, Agent, or Firm* — Canon USA Inc., IP Division

(57) ABSTRACT

A focus adjustment apparatus includes a signal generating unit configured to generate signals of two images respectively corresponding to a pair of light fluxes passing through different pupil regions of a focusing lens, a two-image displacement amount calculation unit configured to calculate a displacement amount of the two images with respect to each other based on a phase difference of the signals of the two images, a steepness calculating unit configured to calculate a steepness of change in a correlation change amount of the two images, a steepness normalization unit that normalizes the steepness, and an evaluating unit configured to evaluate reliability of the displacement amount of the two images based on the normalized steepness.

18 Claims, 15 Drawing Sheets

FIG. 12

|  | LOW RANGE FILTER | MIDDLE RANGE FILTER | HIGH RANGE FILTER |
|---|---|---|---|
| RELIABILITY 0 | ○ | ○ | ○ |
| RELIABILITY 1 | ○ | ○ | × |
| RELIABILITY 2 | ○ | ○ | ○ |
| RELIABILITY 3 | × | ○ | ○ |

FOCUS ADJUSTMENT APPARATUS AND FOCUS ADJUSTMENT METHOD

BACKGROUND OF THE INVENTION

Field of the Invention

The present invention relates to a focus adjustment apparatus and a focus adjustment method. Particularly, the present invention relates to a focus adjustment apparatus and a focus adjustment method that use a phase difference detection method, and a recording medium storing a program to execute the focus adjustment method.

Description of Related Art

The focus adjustment apparatus using the phase difference detection method forms an image on a sensor based on light fluxes, which pass through different exit pupil regions in an imaging optical system, from a subject and calculates a defocus amount of the imaging optical system based on a phase difference of obtained pair of parallax image signals (correlation calculation). Then, an in-focus state of the imaging optical system can be obtained by shifting the focusing lens by a shifting amount corresponding to a defocus amount (see Japanese Patent Application Laid-Open No. 09-054242). In this case, by evaluating reliability of the calculated defocus amount, high quality focusing lens driving can be performed. Japanese Patent Application Laid-Open No. 2007-52206 describes that reliability of a defocus amount is evaluated by using an inclination of a correlation change amount and a similarity level of subject images.

However, it has been found that the evaluation cannot be properly performed since an evaluation value of the reliability changes due to the image pickup apparatus setting (an aperture value, etc.) and a subject (brightness or contrast) when the reliability of the defocus amount is evaluated by using an inclination of the correlation change amount and the similarity level of the subject images. Accordingly, it becomes difficult to execute a stable AF control that improves the accuracy of the reliability evaluation.

To address the above, what is needed is execution of stable AF control that improves the accuracy of the reliability evaluations.

SUMMARY OF THE INVENTION

According to at least one aspect of the present invention, a focus adjustment apparatus includes a signal generating unit configured to generate signals of two images respectively corresponding to a pair of light fluxes passing through different pupil regions of a focusing lens, a two-image displacement amount calculating unit configured to calculate a displacement amount of the two images with respect to each other based on a phase difference of the signals of the two images, a steepness calculating unit configured to calculate a steepness of change in a correlation change amount of the two images, a steepness normalizing unit configured to normalize the steepness, and an evaluating unit configured to evaluate reliability of the displacement amount of the two images based on the normalized steepness.

Further features of the present invention will become apparent from the following description of exemplary embodiments with reference to the attached drawings.

BRIEF DESCRIPTION OF THE DRAWINGS

FIG. 12 is a table illustrating correspondence between filters and reliabilities.

DESCRIPTION OF THE EMBODIMENTS

In the following, an embodiment according to the present invention will be described in detail with reference to the drawings. The following embodiment exemplifies an image pickup apparatus using a phase difference detection system, as an example of a focus adjustment apparatus. The image pickup apparatus can capture an image of a subject and store data of a moving image or a still image to various storage media such as a tape, a solid state memory, an optical disk, and a magnetic disk. The image pickup apparatus is, for example, a digital still camera, a camcorder, or the like. However, the type of the focus adjustment apparatus is not limited to those image pickup apparatuses. Further, the embodiment described below is simply an example and the present invention is not limited to the following embodiment.

<Configuration Example of Image Pickup Apparatus>

Figure 1:
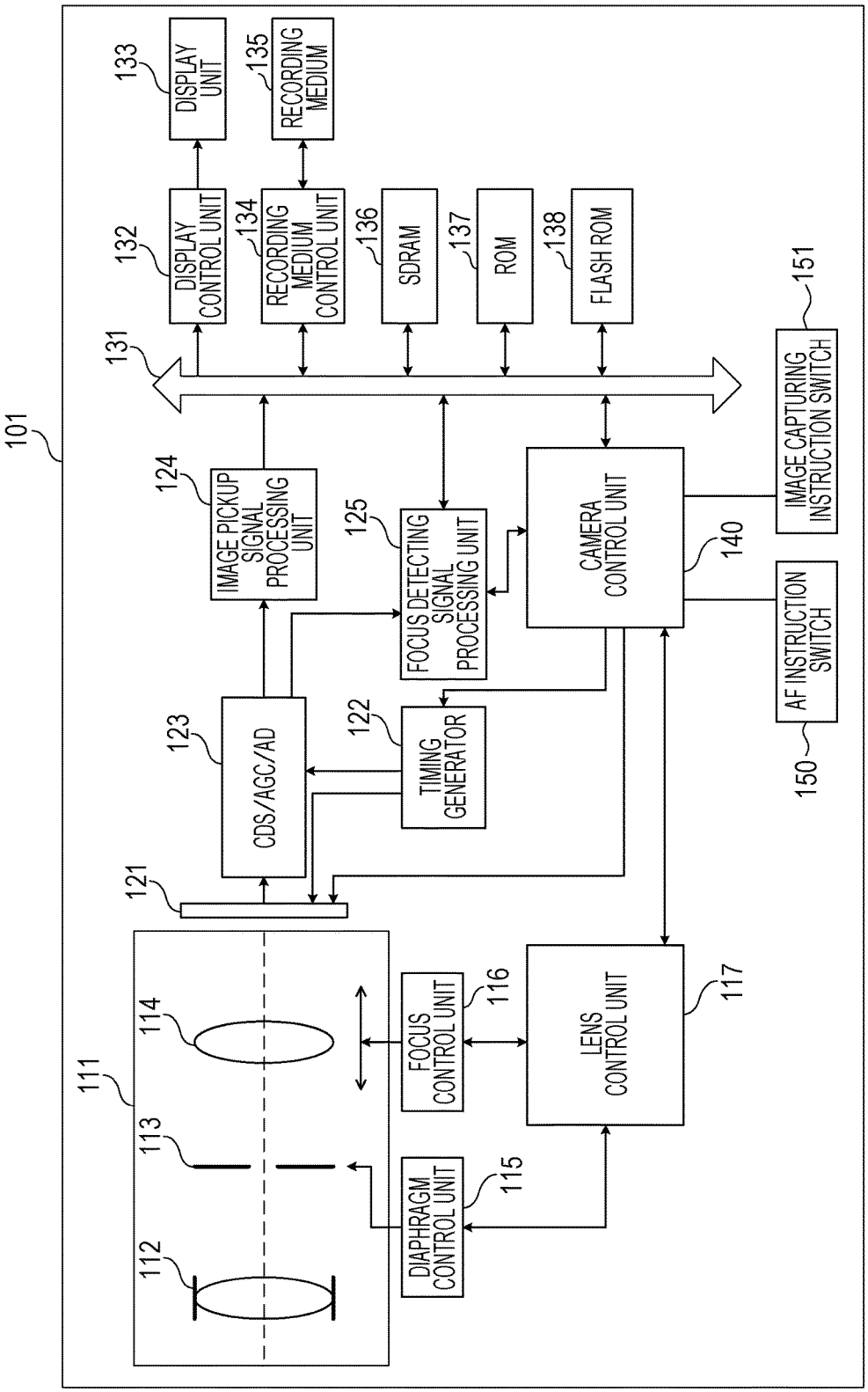
FIG. 1 is a block diagram illustrating configurations of a camera and a lens according to the present invention.

First, a configuration example of an image pickup apparatus 101 (a focus adjustment apparatus) will be described with reference to FIG. 1. FIG. 1 is a block diagram illustrates a configuration example of the image pickup apparatus 101. A lens unit 111 (image pickup lens) includes, as optical elements, a fixed lens 112, a diaphragm 113, and a focusing lens 114. Then, these optical elements form an image pickup optical system. The focusing lens 114 is a focus adjustment lens. In FIG. 1, the focusing lens 114 is shown as a single lens for ease of illustration; however, the focusing lens 114 is generally composed of a plurality of lenses. A diaphragm control unit 115 drives the diaphragm 113 and performs a light amount control when capturing an image by adjusting an aperture diameter of the diaphragm 113. A focus control unit 116 determines a drive amount to drive the focusing lens 114 based on a displacement amount in a focusing direction (optical axis direction) of the lens unit 111. Then, the focus control unit 116 adjusts the focus by driving the focusing lens 114. The control of the focusing lens 114 by the focus control unit 116 realizes an automatic focusing control. A lens control unit 117 controls the diaphragm control unit 115 and the focus control unit 116.

A light flux transmitted through the lens unit 111 forms an image on a light receiving surface of an image pickup element 121, which is an example of a signal generating unit, via the optical elements included in the lens unit 111. The image pickup element 121 is an element (device) that converts a light flux (that is, a subject image (an optical image)) which forms an image on the light receiving surface into a signal charge. The image pickup element 121 is, for example, composed of a CCD or CMOS sensor, or the like. A signal charge accumulated in each photo-electric conversion unit of each pixel of the image pickup element 121 is subsequently read from the image pickup element 121 as a voltage signal corresponding to the signal charge by a driving pulse output by a timing generator 122.

A CDS/AGC/AD circuit 123 performs a correlated double sampling for removing a reset noise, a sensor gain adjustment, and a signal digitalization on an image pickup signal read from the image pickup element 121 and a focus detecting signal of an image pickup plane phase difference system (described later). The CDS/AGC/AD circuit 123 outputs the image pickup signal to an image pickup signal processing unit 124 and outputs a focus detecting signal of the phase difference detection system to a focus detecting signal processing unit 125. The focus detecting signal processing unit 125 performs a correlation calculation on a pair of (two) focus detecting image signals output from the CDS/AGC/AD circuit 123 and calculates a displacement amount between two images and reliability information (a level of similarity and steepness). It is noted that the reliability information will be described later. Further, the focus detecting signal processing unit 125 sets and arranges, on an imaging surface, a focus detection area 602 to detect a focus.

Figure 2:
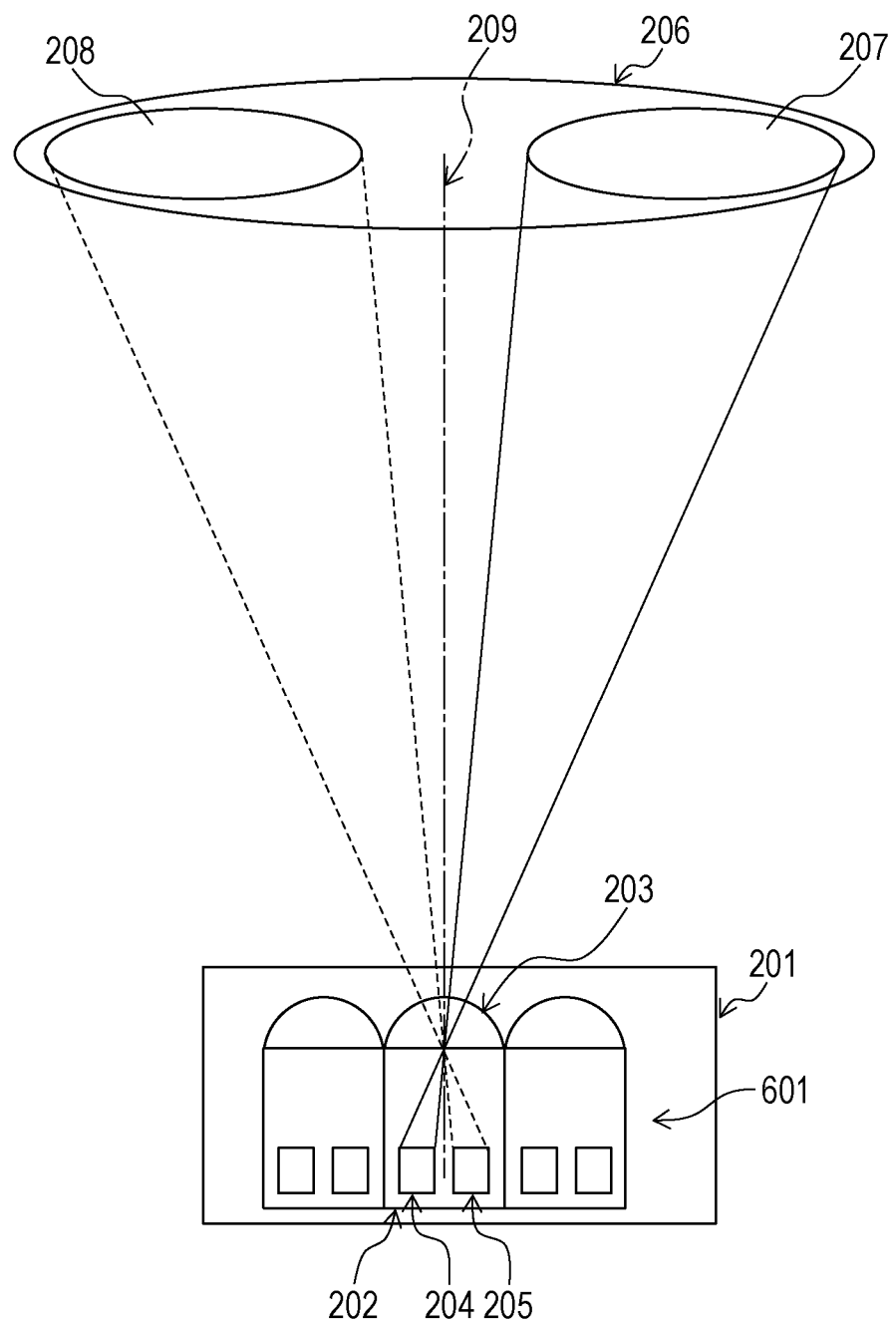
FIG. 2 is a schematic view illustrating a relationship of lights received by a pupil and an image pickup element in an imaging optical system.

Here, with reference to FIG. 2, the image pickup element 121 will be described. The image pickup element 121 has m×n number of pixels, which are two-dimensionally arranged, in a directional vision of a light axis 209 and the pixels form a pixel array 601. Here, since FIG. 2 illustrates the image pickup element 121 with its cross-section 201 parallel to the light axis 209, pixels 202 seem to be arranged one-dimensionally; however, in actuality, the pixel array 601 is composed of a predetermined number of pixels which are arranged two-dimensionally. Each pixel 202 includes a micro lens 203 and two photo-electric conversion units 204 and 205. A light flux which has passed through two different pupil regions (pupil region 207 and pupil region 208) in a pupil 206 of an imaging optical system is respectively directed into the two photo-electric conversion units 204 and 205 via the micro lens 203 arranged in each pixel 202 around the light axis 209. Then, the two photo-electric conversion units 204 and 205 of each pixel generate an electric charge signal corresponding to the light flux incident thereupon.

With such a configuration, a single pixel can generate two types of signals including an image pickup signal and a focus detecting signal; the focus detecting signal is used for automatic focusing in the phase difference detection system. In other words, an image pickup signal can be generated by adding signal charges of the two photo-electric conversion units 204 and 205. The image pickup signal processing unit 124 generates an image signal (image data) from the image pickup signal read from the image pickup element 121.

Further, the focus detecting signal processing unit 125 acquires a pair of (two) images having different parallax (parallax images) by handling the respective outputs from the two photo-electric conversion units 204 and 205 and calculates a focus detection. The focus detection method will be described later in detail. According to the embodiment of the present invention, an image (image signal) which can be acquired by adding the outputs of the two photo-electric conversion units 204 and 205 is referred to as an A+B image, and the images (image signals) which can be respectively acquired from the outputs of the two photo-electric conversion units 204 and 205 are referred to as an A image and a B image. Here, a method for generating a phase-difference signal is not limited to the above described method and various other known methods may be used.

Further, the image pickup signal processing unit 124 generates an image signal from an image pickup signal output from the CDS/AGC/AD circuit 123 and stores the image signal to an SDRAM 136 via a bus 131. The display control unit 132 can read the image signal stored in the SDRAM 136 via the bus 131 and display an image on a display unit 133. Further, in an operation mode for recording an image signal, a recording medium control unit 134 records the image signal stored in the SDRAM 136 to a recording medium 135.

In a ROM 137, a camera control unit 140 stores a control program, which is a computer program executed to control the image pickup apparatus 101, and various data and the like needed to control the image pickup apparatus 101. In a flash ROM 138, various information or the like such as user setting information related to an operation of the image pickup apparatus 101 is stored.

The camera control unit 140 determines a drive amount of the focusing lens 114 (hereinafter, referred to as a lens drive amount) based on a defocus amount calculated and output by the focus detecting signal processing unit 125 and reliability of the defocus amount. The reliability indicates in what level the calculated defocus amount is stable. For example, in a case that a defocus amount is calculated a plurality of times with a same object in a same setting in a same environment, the reliability is assumed to indicate in what level the calculation result varies and, according to the embodiment of the present invention, the reliability is evaluated with a steepness of an amount of change in correlation (hereinafter, referred to as "maxder"). According to the embodiment of the present invention, when the reliability of the defocus amount is low, the camera control unit 140 determines, as a lens drive amount, a fixed value, which is not related to the defocus amount calculated and output by the focus detecting signal processing unit 125. On the other hand, when the reliability of the defocus amount is high, the defocus amount is converted into a lens drive amount. Then, the lens drive amount is transmitted to the lens control unit 117 and further transmitted to the focus control unit 116. Then, the focus control unit 116 drives the focusing lens 114 by the transmitted lens drive amount. With this configuration, an automatic focusing control (AF control) is realized.

In addition, based on an operation by a user (operator) or a magnitude of a pixel signal of image data temporarily stored in the SDRAM 136, the camera control unit 140 determines an accumulation period of the image pickup element 121, a gain setting value of the CDS/AGC/AD circuit 123, and a setting value of the timing generator 122.

An AF instruction switch 150 is a switch used by the user (operator) to instruct an execution of the AF operation. An image capturing instruction switch 151 is a switch used by the user to instruct an execution of image capturing. For example, the image pickup apparatus 101 includes a shutter button, and the AF instruction switch 150 and image capturing instruction switch 151 are provided to work according to the operation on the shutter button. When the shutter button is not being pressed, the AF instruction switch 150 and image capturing instruction switch 151 are both off. Then, when the shutter button is half pressed, the AF instruction switch 150 is turned on and, when the shutter button is fully pressed, the image capturing instruction switch 151 is turned on.

The camera control unit 140 includes a CPU that executes a computer program. Then, the CPU of the camera control unit 140 reads a control program, which is a computer program stored in the ROM 137, to execute the program by developing in the SDRAM 136. With this configuration, various processes including a later described image capturing process are executed and the automatic focusing control (AF control) according to the embodiment of the present invention is realized.

<Example of Image Capturing Process>

Figure 3:
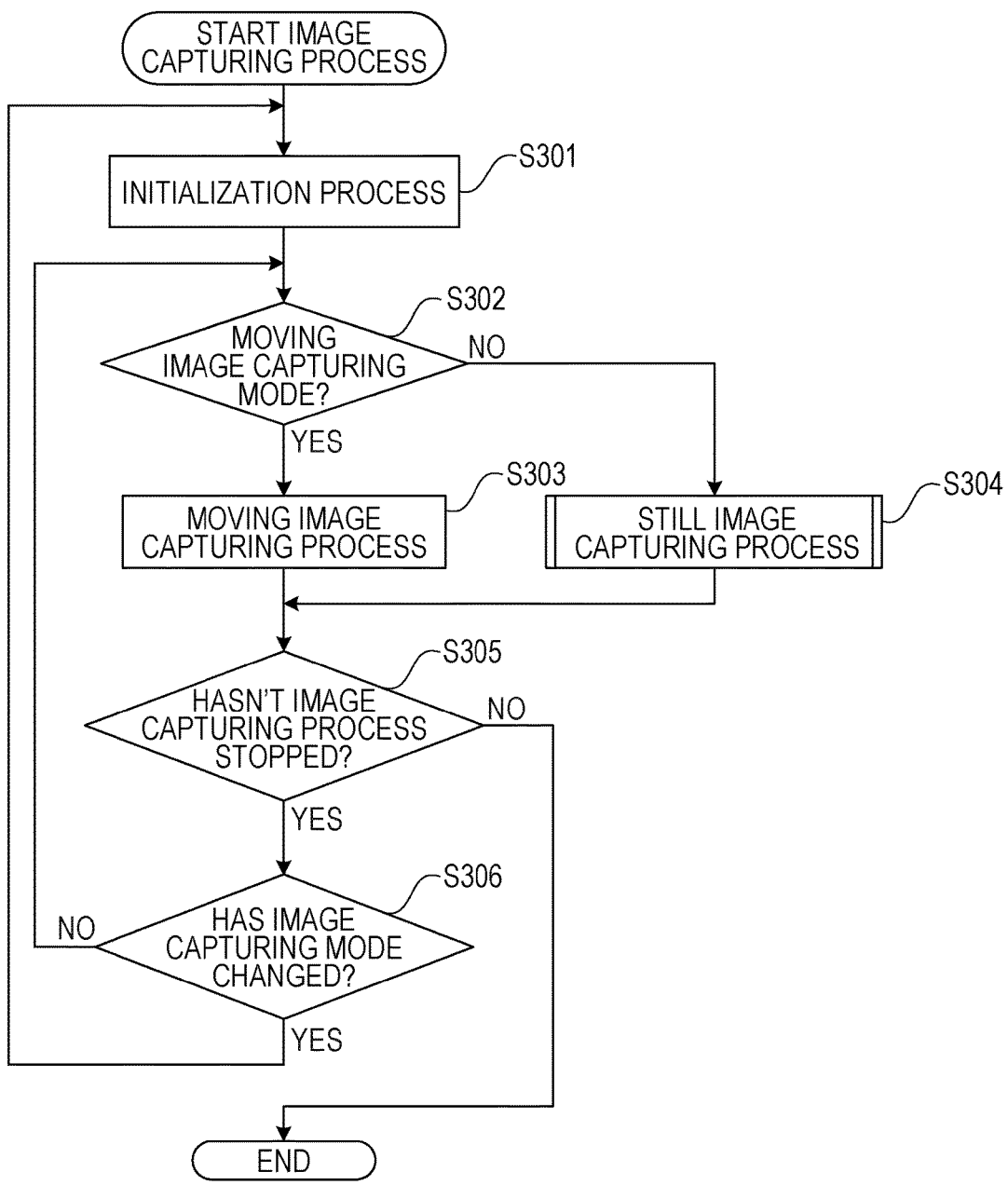
FIG. 3 is a flowchart illustrating an example of an image pickup process.

Next, an operation of the image pickup apparatus 101 will be explained with reference to FIG. 3. FIG. 3 is a flowchart illustrating an image capturing process of the image pickup apparatus 101.

In an "Initialization process" in step S301, the camera control unit 140 executes an initialization process of the image pickup apparatus 101. Then, the process proceeds to step S302.

In a process of "Moving image capturing mode?" in step S302, the camera control unit 140 determines whether the image capturing setting of the image pickup apparatus 101 is in a moving image capturing mode or a still image capturing mode. When it is determined that the setting is in the moving image capturing mode (in a case of "Y"), the process proceeds to step S303 and, when it is determined that the setting is in the still image capturing mode (in a case of "N"), the process proceeds to step S304.

In a "Moving image capturing process" in step S303, the camera control unit 140 executes a moving image capturing process. After that, the process proceeds to step S305. Here, details of the moving image capturing process in step S303 will be omitted.

In a "Still image capturing process" in step S304, the camera control unit 140 executes a still image capturing process. The still image capturing process will be described later. Then, the process proceeds to step S305.

In a process of "Has image capturing process not stopped?" in step S305, the camera control unit 140 determines whether the image capturing process has not stopped. When it is determined that the image capturing process has not stopped (in a case of "Y"), the process proceeds to S306 and, when it is determined that the image capturing process has stopped (in a case of "N"), the image capturing process ends. The case that the image capturing process has stopped is, for example, a case that an operation to turn off the image pickup apparatus 101 is performed or a case that an operation other than image capturing, such as a user setting process of the image pickup apparatus 101 and a reproduction process to check a captured image or movie, is performed.

In a process of "Has image capturing mode changed?" in step S306, the camera control unit 140 determines whether the image capturing mode has been changed. Then, when it is determined that the mode has been changed (in a case of "Y"), the process returns to S301. When the image capturing mode has been changed, the camera control unit 140 performs a process in the changed image capturing mode after executing an initialization process in step S301. When it is determined that the mode has not changed (in a case of "N"), the process returns to S302. When the image capturing mode has not changed, the camera control unit 140 continues the processes in the current image capturing mode without performing an initialization process.

<Example of Still Image Capturing Process>

Figure 4:
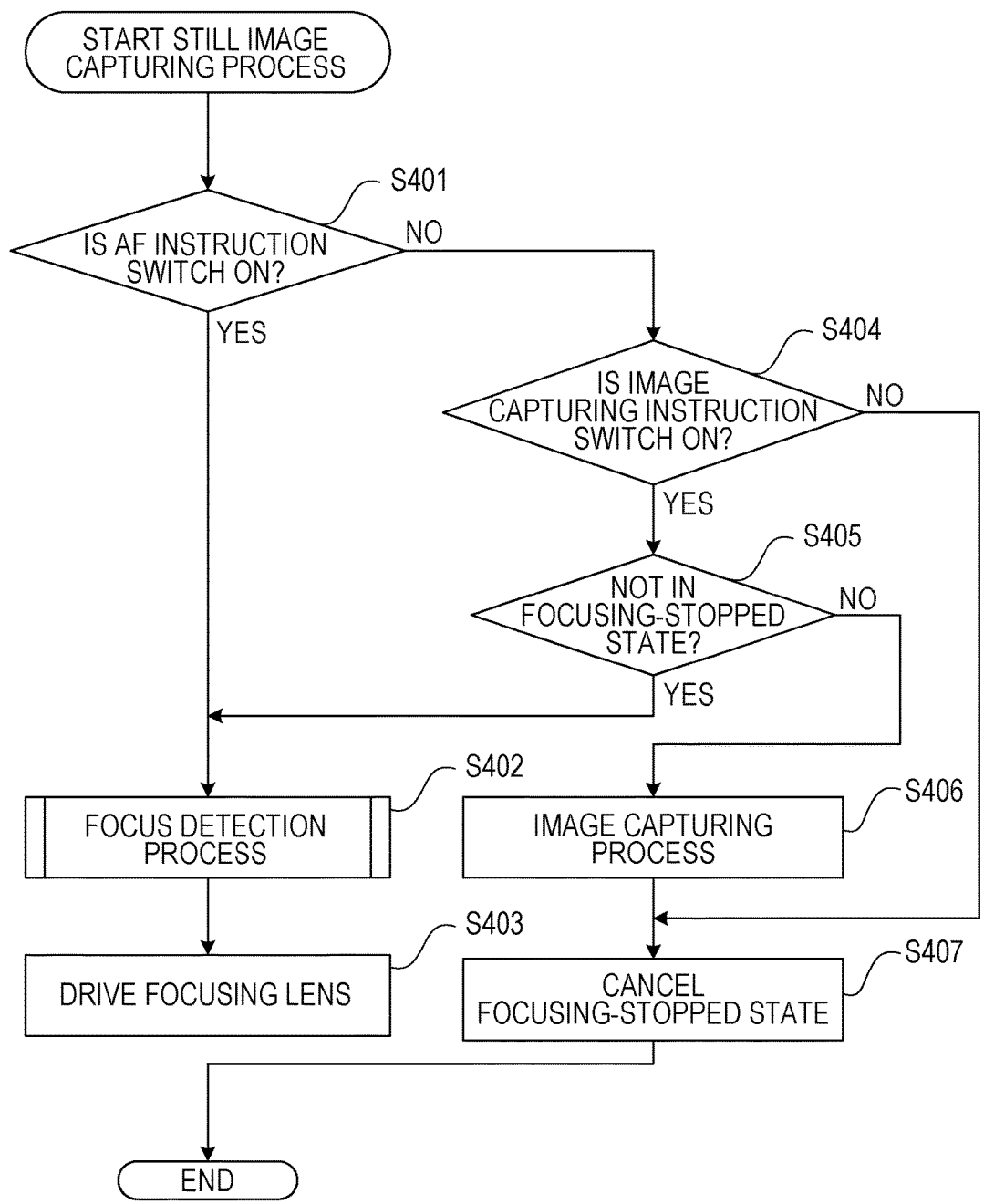
FIG. 4 is a flowchart illustrating an example of a still image capturing process.

Next, the content of the still image capturing process in step S304 will be described with reference to FIG. 4. FIG. 4 is a flowchart illustrating an example of the still image capturing process in step S304 of FIG. 3.

In a process "Is AF instruction switch on?" in step S401, the camera control unit 140 determines whether the AF instruction switch 150 is on or off. When it is determined that the AF instruction switch 150 is off (in a case of "N"), the process proceeds to step S404. When it is determined that the AF instruction switch 150 is on (in a case of "Y"), the process proceeds to step S402.

In a process "Is image capturing instruction switch on?" in step S404, the camera control unit 140 determines whether the image capturing instruction switch 151 is on or off. When it is determined that the image capturing instruction switch 151 is on (in a case of "Y"), the process proceeds to step S405. When it is determined that the image capturing instruction switch 151 is off (in a case of "N"), the process proceeds to step S407.

In a process "Not in focusing-stopped state?" in step S405, the camera control unit 140 determines whether or not the image pickup apparatus 101 is in a focusing-stopped state. The focusing-stopped state is a state that a defocus amount with respect to a subject is equal to or lower than a predetermined value and the image pickup apparatus 101 is ready to focus on the subject to perform an image capturing process. When the image pickup apparatus 101 is not in a focusing-stopped state (in a case of "Y"), the process proceeds to step S402. When the image pickup apparatus 101 is in a focusing-stopped state (in a case of "N"), the process proceeds to step S406.

In a "Focus detection process" in step S402, the camera control unit 140 determines a lens drive amount based on a defocus amount output from the focus detecting signal processing unit 125 and reliability of the defocus amount. The content of the focus detection process will be described later. The determined lens drive amount is transmitted to the lens control unit 117. Then, the process proceeds to step S403.

In a process to "Drive focusing lens" in step S403, the lens control unit 117 controls the focus control unit 116 and drives the focusing lens 114 to achieve the lens drive amount transmitted from the camera control unit 140 (the lens drive amount determined in step S402). Then, the still image capturing process ends.

In an "Image capturing process" in step S406, the camera control unit 140 performs an image capturing process. In other words, the case that the process proceeds to step S406 is a case that it is determined that the image capturing instruction switch 151 is on in step S404 and determined that the image pickup apparatus 101 is in a focusing-stopped state in step S405 and a case that the image pickup apparatus 101 is in-focus to the subject. Thus, in such a case, the image pickup apparatus 101 performs an image capturing process. For example, the CDS/AGC/AD circuit 123 performs the above described process on the image pickup signal read from the image pickup element 121 and outputs the signal to the image pickup signal processing unit 124. The image pickup signal processing unit 124 generates an image signal based on the image pickup signal output from the CDS/

AGC/AD circuit 123 and stores the image signal to the SDRAM 136 via the bus 131. The recording medium control unit 134 records the image signal stored in the SDRAM 136 to the recording medium 135. Then, the process proceeds to step S407.

In a process to "Cancel focusing-stopped state" in step S407, the camera control unit 140 cancels the focusing-stopped state. Then, the still image capturing process ends.

<Example of Focus Detection Process>

Figure 5:
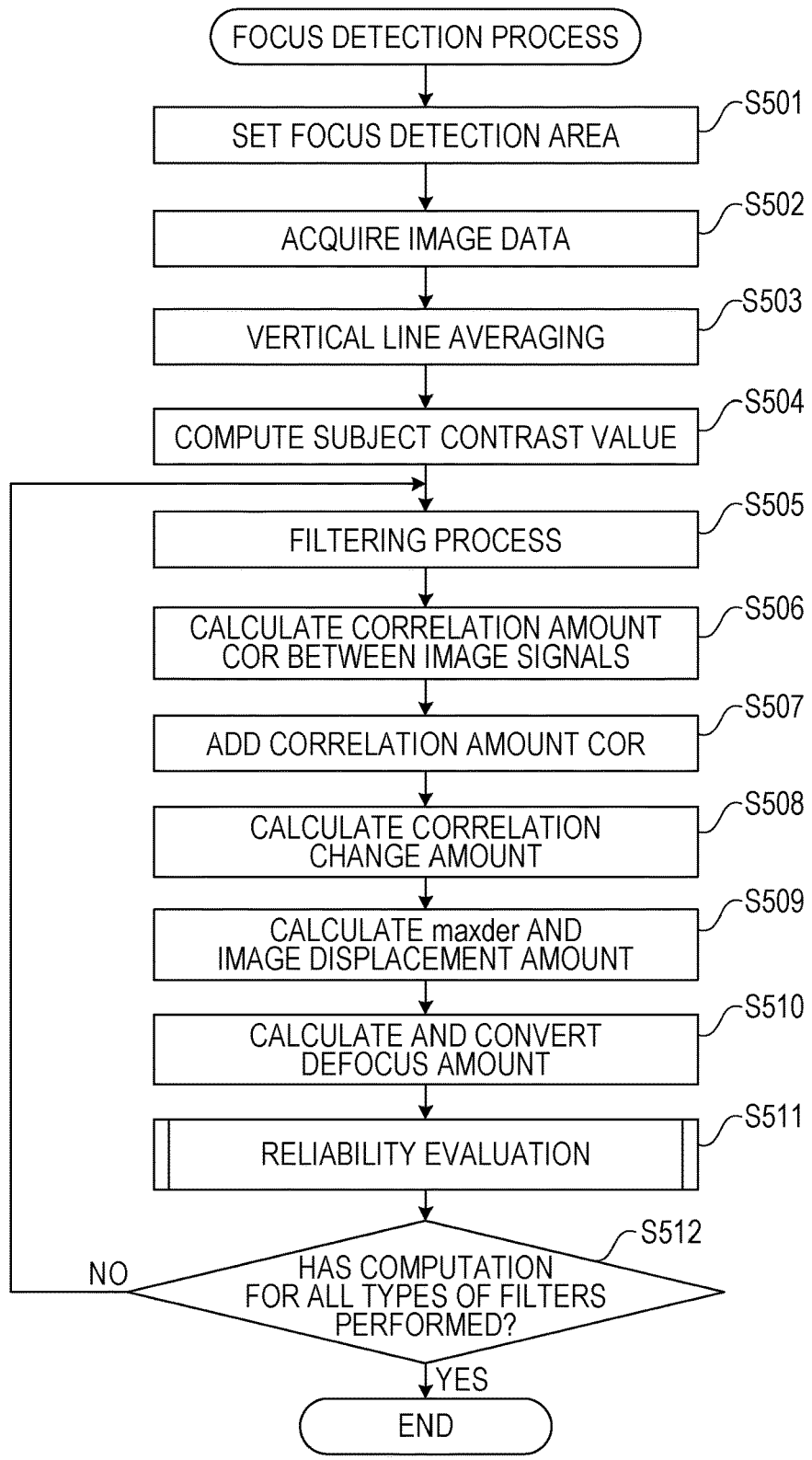
FIG. 5 is a flowchart illustrating an example of a focus detection process.

Next, the focus detection process of step S402 will be described with reference to the flowchart of FIG. 5. FIG. 5 is a flowchart illustrating an example of the focus detection process.

Figure 6:
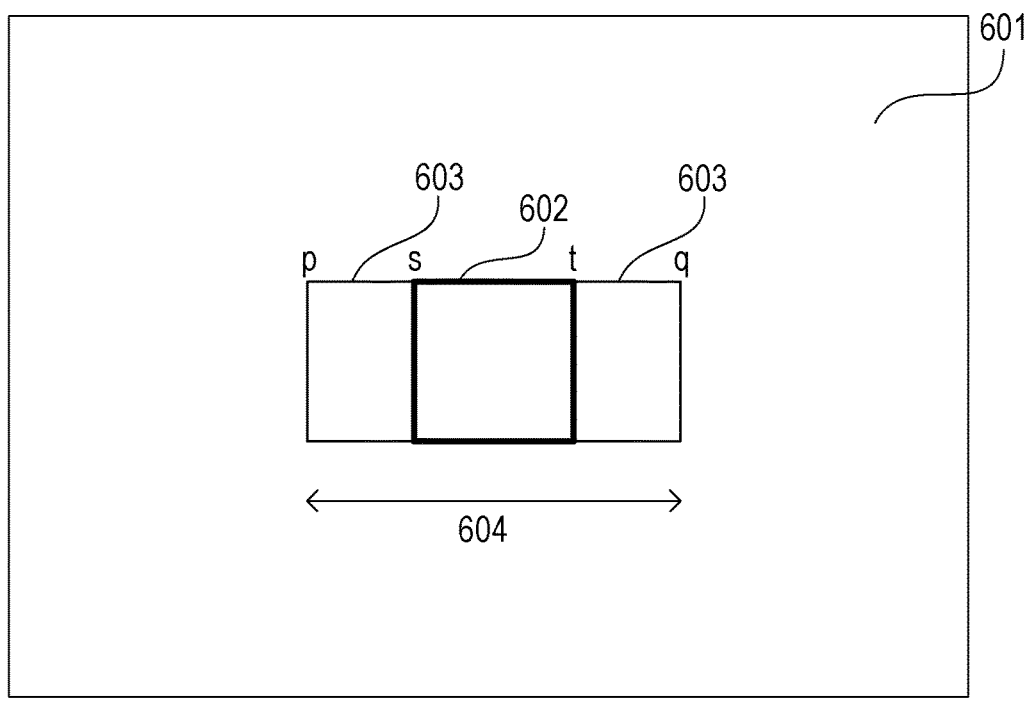
FIG. 6 is a diagram schematically illustrating an example of a focus detection area.

In a process to "Set focus detection area" in S501, the focus detecting signal processing unit 125 sets a focus detection area 602, which may be any region, from focus detection areas 602 which are two-dimensionally arranged on the imaging surface (see FIG. 6). Then, the process proceeds to step S502.

In a process to "Acquire image data" in step S502, the focus detecting signal processing unit 125 acquires a pair of (two) image signals (the A image and B image) for focus detection from the image pickup element 121, regarding the set focus detection area 602.

In a process of "Vertical line averaging" in step S503, the focus detecting signal processing unit 125 performs, on the acquired pair of image signals, line averaging in a vertical direction to reduce effects of noise. Here, the vertical direction represents an extended direction of a vertical signal line (vertical communication path) of the image pickup element 121. According to the embodiment of the present invention, the number of the vertical line additions is reduced when a rapid computation processing such as a consecutive shooting mode is desired to be performed, and the number of the vertical line additions is increased when noise in signals is notable, such as in a dark place. Then, the process proceeds to step S504.

In a process to "Compute subject contrast value" in step S504, the focus detecting signal processing unit 125 calculates a subject contrast value CNT, which is defined in following Expression 1.

[Expression 1]

$$CNT = (Peak - Bottom)/Peak \quad (1)$$

Here, Peak is a variable that indicates a maximum value (maximum output value) of waveforms which are added and averaged in the vertical direction, and Bottom is a variable that indicates a minimum value (minimum output value) of waveforms which are averaged in the vertical direction. As expressed in Expression 1, the focus detecting signal processing unit 125 calculates a subject contrast value CNT by dividing a difference between the maximum value and minimum value of the waveforms, which are added and averaged in the vertical direction, with the maximum value. The subject contrast value CNT is used to evaluate reliability of the defocus amount.

In a "Filtering process" in step S505, the focus detecting signal processing unit 125 performs a filtering process in which a signal component in a predetermined frequency band is extracted from the signals which are line-averaged in the vertical direction in step S503. According to the embodiment of the present invention, three types of filters that respectively extract different frequency bands (a low frequency band filter, a medium frequency band filter, and a high frequency band filter) are provided in advance. Then, which defocus amount among the defocus amounts calculated by using the respective filters is switched according to a blurring level or the like of the subject. When the low frequency band filter is used, a focus detection performance (defocus amount calculation performance) for a way-out-of-focus subject, whose edge is blur, improves. When the high frequency band filter is used, the focus detection can be accurately performed near a focal point of a subject whose edge is clear (the accuracy of the defocus amount calculation can be improved). Here, the configuration using the three types of filters does not set any limitation, and any configuration including at least one or more type of filter may be employed.

In a process to "Calculate correlation amount COR between image signals" in S506, the focus detecting signal processing unit 125 calculates a correlation amount COR between the acquired pair of (two) image signals (which are signal components of a predetermined frequency band extracted in the filtering process). According to the embodiment of the present invention, this calculation is referred to as "correlation calculation." Here, the focus detecting signal processing unit 125 performs the correlation calculation for respective scan lines after averaging in the vertical direction in the focus detection area.

In a process to "Add correlation amount COR" in step S507, the focus detecting signal processing unit 125 adds a waveform of the correlation amount COR in the focus detection area (a correlation change amount addition unit).

In a process to "Calculate correlation change amount" in step S508, the focus detecting signal processing unit 125 calculates a correlation change amount based on the correlation amount COR.

In a process to "Calculate maxder and image displacement amount" in step S509, the focus detecting signal processing unit 125 calculates a displacement amount of the two images (the A image and B image with respect to each other) based on the calculated correlation change amount (two-image displacement amount calculation unit). Further, the focus detecting signal processing unit 125 calculates a steepness of change in the correlation change amount (hereinafter, referred to as maxder) (steepness calculation unit).

In a process to "Calculate and convert defocus amount" in step S510, the focus detecting signal processing unit 125 calculates a defocus amount by multiplying a predetermined conversion coefficient with the displacement amount of the two images, which is calculated in step S509 (defocus amount calculation unit). The conversion coefficient used in this case is a coefficient determined based on a coordinate that sets an aperture value of the diaphragm 113, an exit pupil distance of the lens, individual information of the image pickup element 121, and the focus detection area 602, and is stored in the ROM 137 in advance. Then, the focus detecting signal processing unit 125 normalizes the calculated defocus amount by dividing an aperture value F of the diaphragm 113 and an allowance scattering circle δ and cancels dependency of the aperture value F.

In a process of "Reliability evaluation" in step S511, the focus detecting signal processing unit 125 evaluates reliability of the defocus amount calculated in step S510 based on the maxder (steepness) calculated in step S509. Here, the content of the process of the reliability evaluation in step S511 will be described later.

In a process "Has computation for all types of filters performed?" in step S512, the focus detecting signal processing unit 125 determines whether the processes in steps S505 to S511 have been performed on all of the previously provided three types of filters (the low frequency band filter, medium frequency band filter, and high frequency band filter). When there is a filter on which the processes have not been performed (in a case of "N"), the process returns to step S505 and the processes in steps S505 to S511 are performed on the filter on which the processes have not performed. When the processes have performed on the all types of filters (in a case of "Y"), the focus detection process ends.

Here, the details of the focus detection process will be described with reference to FIGS. 6 to 9B.

FIG. 6 is a diagram schematically illustrating an example of the focus detection area 602. FIG. 6 illustrates an example of the focus detection area 602 on the pixel array 601 of the image pickup element 121. Here, on the pixel array 601, a plurality of focus detection areas 602 are two-dimensionally arranged and the focus detecting signal processing unit 125 selects and uses the focus detection areas 602 according to an operation by the user or the like. Shift areas 603 in both sides of the focus detection area 602 are areas needed in the correlation calculation. Thus, a pixel area 604 including the focus detection area 602 and shift areas 603 is a pixel area needed in the correlation calculation. The references p, q, s, and t in FIG. 6 respectively represent coordinates in a horizontal direction (direction of axis x), the references p and q respectively indicate x-coordinates of a beginning and an end of the pixel area 604, and the references s and t respectively indicate x-coordinates of a beginning and an end of the focus detection area 602.

Figure 7A:
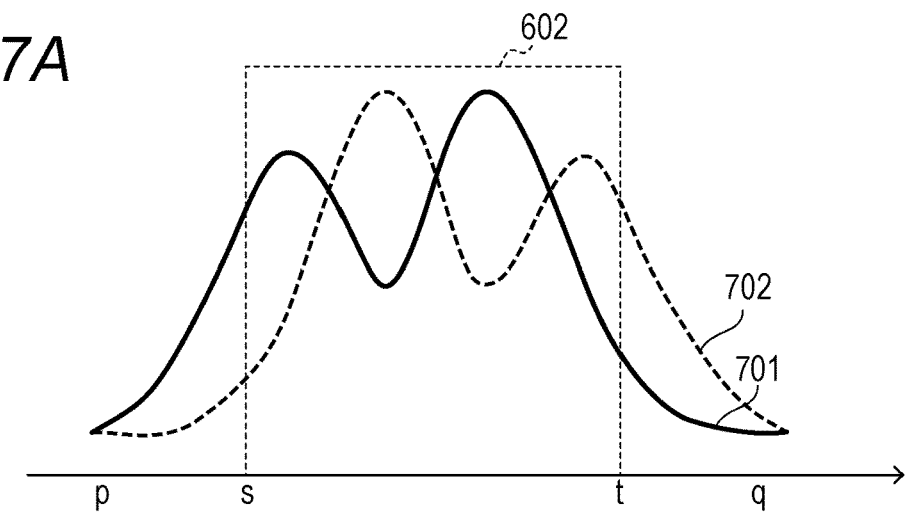
FIGS. 7A, 7B, and 7C are diagrams schematically illustrating examples of an image signal obtained from the focus detection area.
Figure 7B:
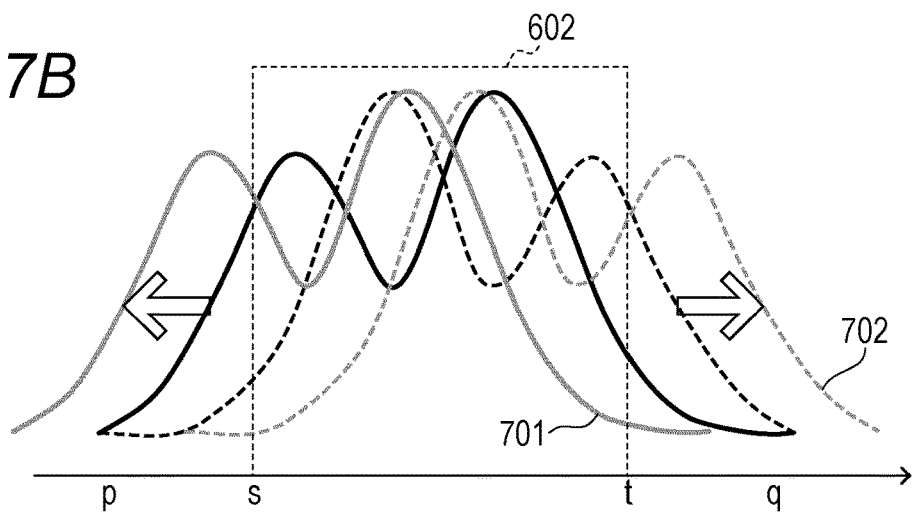
Figure 7C:
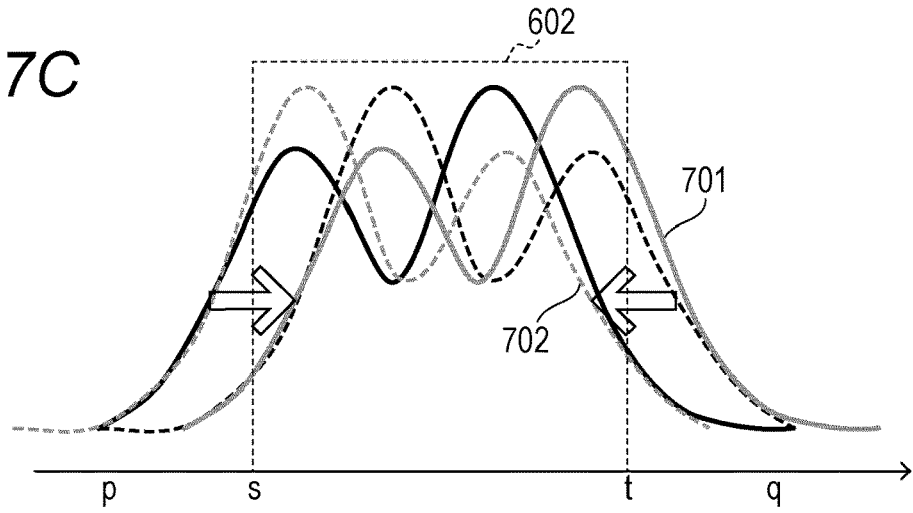

FIGS. 7A to 7C are diagrams schematically illustrating an example a pair of image signals obtained from the focus detection area 602. Here, FIGS. 7A to 7C illustrate an example of the pair of image signals for focus detection, on which the filtering process has been performed. One image signal A701 is illustrated with the continuous lines and the other image signal B702 is illustrated with the broken lines. Here, FIG. 7A illustrates image signals A701 and B702 before shifting, and FIGS. 7B and 7C respectively illustrate the image signals A701 and B702 shifted in a plus direction and a minus direction from the condition of FIG. 7A. When a correlation amount of the pair of image signals A701 and B702 is calculated, both of the image signal A701 and image signal B702 are shifted by one bit in the direction indicted by the arrow.

A method of calculating the correlation amount is as follows. Firstly, as illustrated in FIGS. 7B and 7C, the image signals A701 and B702 are respectively shifted by an amount of any certain number of bits and a sum of absolute values of the difference between the image signals A701 and B702 is calculated. According to the embodiment of the present invention, the bit width to be shifted and a total shift amount are switched according to the filter to be used. When the low frequency band filter is used, since it is aimed to detect a focusing state from the way-out-of-focus subject, the total shift amount is increased compared to the case that the high frequency band filter is used and the bit width to shift is increased to shorten the computation time. On the other hand, when the high frequency band filter is used, to perform detecting of a focusing state accurately, the bit width to be shifted is reduced compared to the case that the low frequency band filter is used, and the total shift amount is reduced to shorten the computation time.

The correlation amount COR can be calculated by following Expression 2. Here, the total shift amount is represented as i, the minimum shift amount is represented as p−s, the maximum shift amount is represented as q−t, x is used as a beginning coordinate of the focus detection area 602, and y is used as an end coordinate of the focus detection area 602. Here, it can be expressed as (p−s)≤i≤(q−t).

[Expression 2]

$$COR[i]=\Sum_{k=x}^{y}|A[k+i]-B[k-i]| \quad (2)$$

Figure 8A:
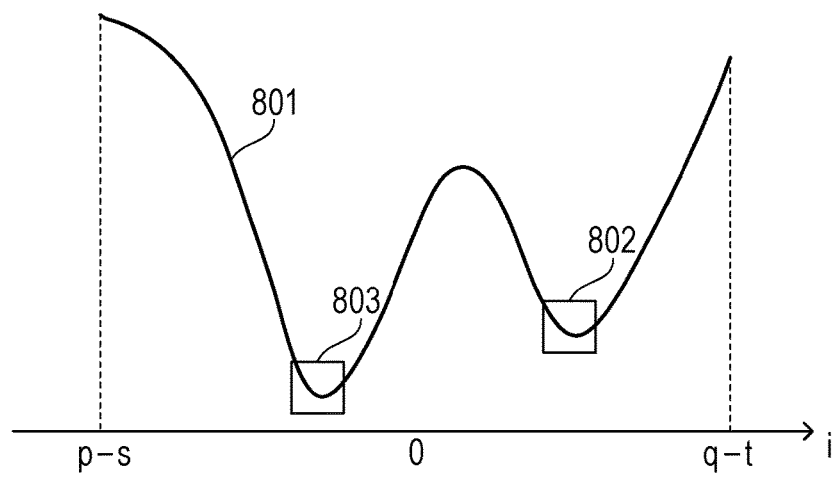
FIGS. 8A and 8B are diagrams illustrating an example of a correlation amount waveform.
Figure 8B:
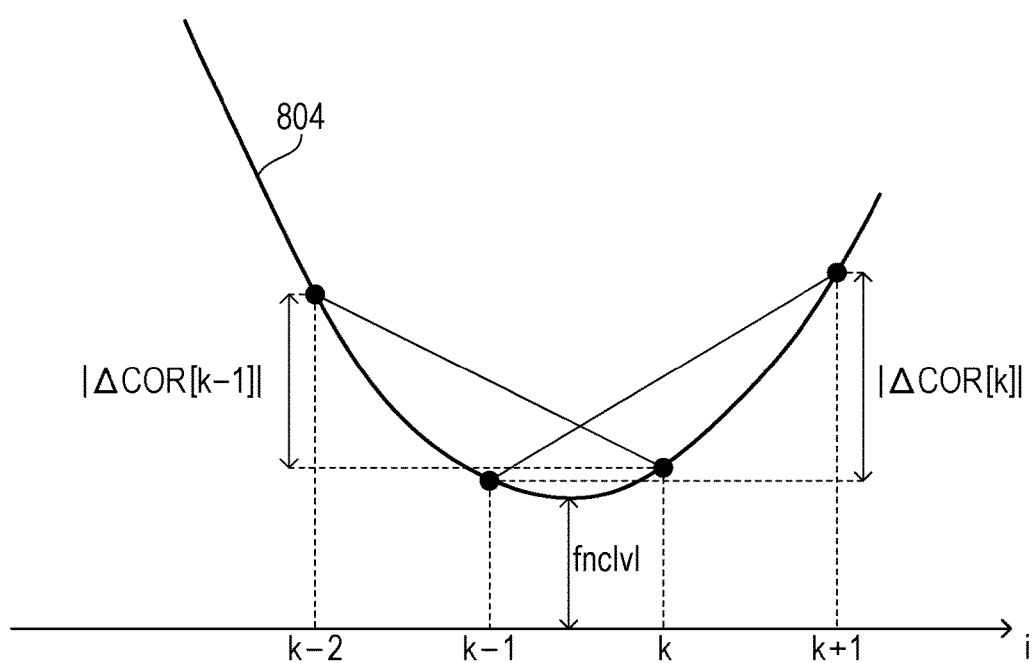

FIG. 8A illustrates an example of a relationship between the shift amount and correlation amount COR (correlation amount waveforms). FIG. 8B is an enlarged view of an extreme value vicinity 803 of FIG. 8A, and the curved line indicated by reference 804 is the part of the correlation amount waveform 801 in the extreme value vicinity 803. The horizontal axis represents shift amounts and the vertical axis represents correlation amounts COR. As illustrated in FIG. 8A, the correlation amount waveform 801 changes according to the shift amount. Among the plurality of extreme value vicinities 802 and 803 included in the correlation amount waveform 801, at the shift amount corresponding to the extreme value vicinity 803 having a smallest value, a level of similarity of two images, which is a level of similarity of the pair of image signals A and B, becomes the maximum.

A method for calculating a correlation change amount is as follows. The focus detecting signal processing unit 125 calculates a difference between correlation amounts in every other shifts in the correlation amount waveform 801 illustrated in FIG. 8A, as a correlation change amount. When the shift amount is represented as i, the minimum shift amount is represented as p−s, the maximum shift amount is represented as q−t, a correlation change amount ΔCOR can be calculated with following Expression 3. Here, it is noted that {(p−s+1)≤i≤(q−t−1)}.

[Expression 3]

$$\Delta COR[i]=COR[i-1]-COR[i+1] \quad (3)$$

Figure 9A:
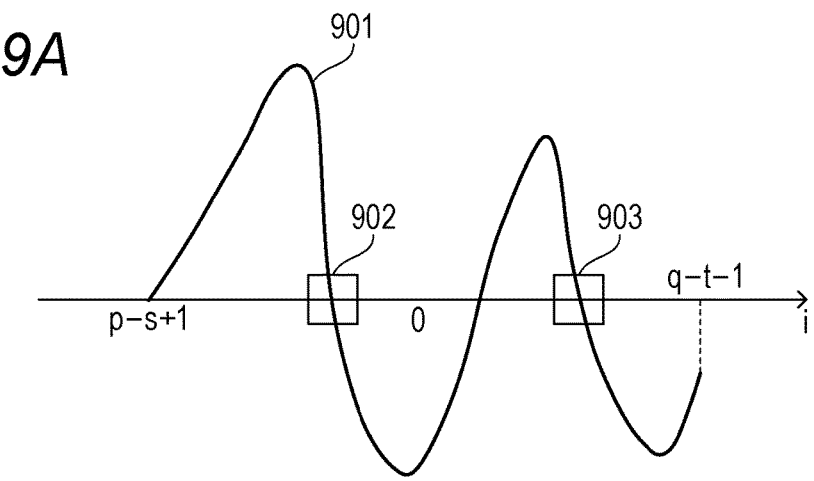
FIGS. 9A and 9B are diagrams illustrating an example of a correlation change amount waveform.

FIG. 9A is a diagram illustrating an example of a relationship between shift amounts and correlation change amounts ΔCOR (correlation change amount waveforms). The horizontal axis represents shift amounts and the vertical axis represents correlation change amounts ΔCOR. The correlation change amount 901 varies corresponding to shift amounts. In FIG. 9A, the correlation change amount 901 changes from positive to negative at the part indicated by the reference numerals 902 and 903. A state that the correlation change amount becomes zero is referred to as a zero-crossing, and the similarity level of the two images of the pair of image signals A and B becomes maximum. Thus, the shift amounts that cause a zero-crossing become a displacement amount of the two images.

Figure 9B:
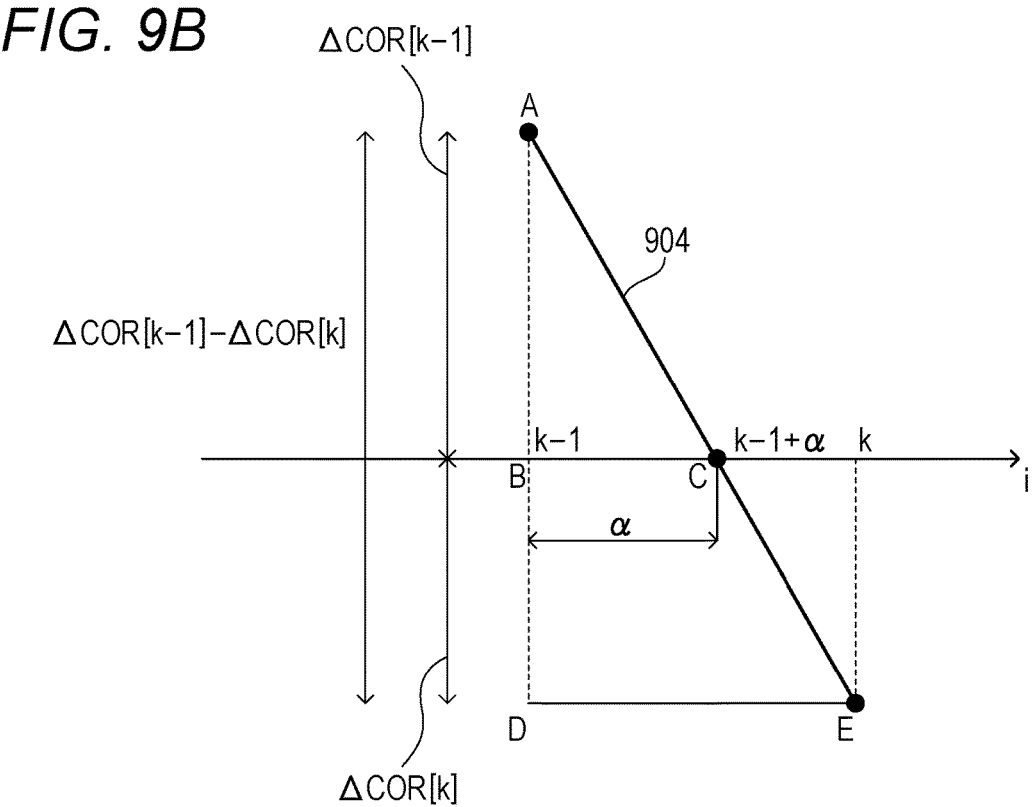

FIG. 9B is an enlarged view of a part indicated by the reference numeral 902 in FIG. 9A. The line indicated by the reference numeral 904 is a part of the correlation change amount 901. Here, a method of calculating a two-image displacement amount PRD will be described with reference to FIG. 9B.

The shift amount (k−1+α) that causes a zero-crossing is divided into an integer portion β(=k−1) and a fractional portion α. The fractional portion α can be calculated by using following Expression 4, based on a relationship of the similarity between the triangle ABC and triangle ADE in the drawing of FIG. 9B.

[Expression 4]

$$AB:AD = BC:DE \quad (4)$$
$$\Delta COR[k-1]:\Delta COR[k-1] - \Delta COR[k] = \alpha:k - (k-1)$$
$$\alpha = \frac{\Delta COR[k-1]}{\Delta COR[k-1] - \Delta COR[k]}$$

The integer portion β can be calculated by using following Expression 5, based on FIG. 9B.

[Expression 5]

$$\beta = k-1 \quad (5)$$

Then, based on the sum of α and R, a two-image displacement amount PRD can be calculated.

As illustrated in FIG. 9A, when there are more than one zero-crossings in the correlation change amounts ΔCOR, the zero-crossing having the largest maxder in the vicinity is set as a first zero-crossing. Maxder is an index that indicates how easily the focus detection can be performed and a greater value indicates that an accurate focus detection can be performed more easily. The maxder can be calculated by using following Expression 6. Here, ΔCOR[k−1] is a correlation change amount between shift amounts k−2 to k, and ΔCOR[k] is a correlation change amount between shift amounts k−1 to k+1.

[Expression 6]

$$\text{maxder} = |\Delta COR[k-1]| + |\Delta COR[k]| \quad (6)$$

As described above, according to the embodiment of the present invention, when there are more than one zero-crossings in the correlation change amounts, the first zero-crossing is determined based on maxder. Then, a shift amount that causes the first zero-crossing is set as the two-image displacement amount PRD.

<Reliability Evaluation>

Next, the reliability evaluation in step S511 (see FIG. 5) will be described with reference to FIGS. 10 to 15. As described above, the reliability indicates in what level the calculation result varies when a defocus amount is calculated more than one time in a same setting with respect to a same subject in a same environment. Thus, in a case that the reliability of the calculated defocus amount is high, focusing can be performed accurately when the calculated defocus amount is set as the lens drive amount and the focusing lens 114 is driven. On the other hand, in a case that the reliability is low, the accuracy of focusing is reduced.

The embodiment of the present invention describes an example to evaluate the reliability in four levels in ascending order, Reliability 0 (zero level), Reliability 1 (first level), Reliability 2 (second level), and Reliability 3 (third level). The definitions of the respective reliabilities are as follows. Reliability 0 indicates that the detected defocus amounts widely vary so that the reliability of the defocus amounts is low (not reliable), and the reliability of defocusing direction is also low (not reliable). Reliability 1 indicates that the reliability of defocus amount for a way-out-of-focus subject or the like is low (not reliable) but only the detected defocus direction can be used. Reliability 2 indicates that the reliability of the calculated defocus amount is high (reliable) but the accuracy is low. Reliability 3 indicates that focusing can be performed since the reliability of the detected defocus amount is high (reliable) and the accuracy is high. Here, the levels of the reliability evaluation are not limited to the four levels and the levels may be set with any numbers.

Figure 10:
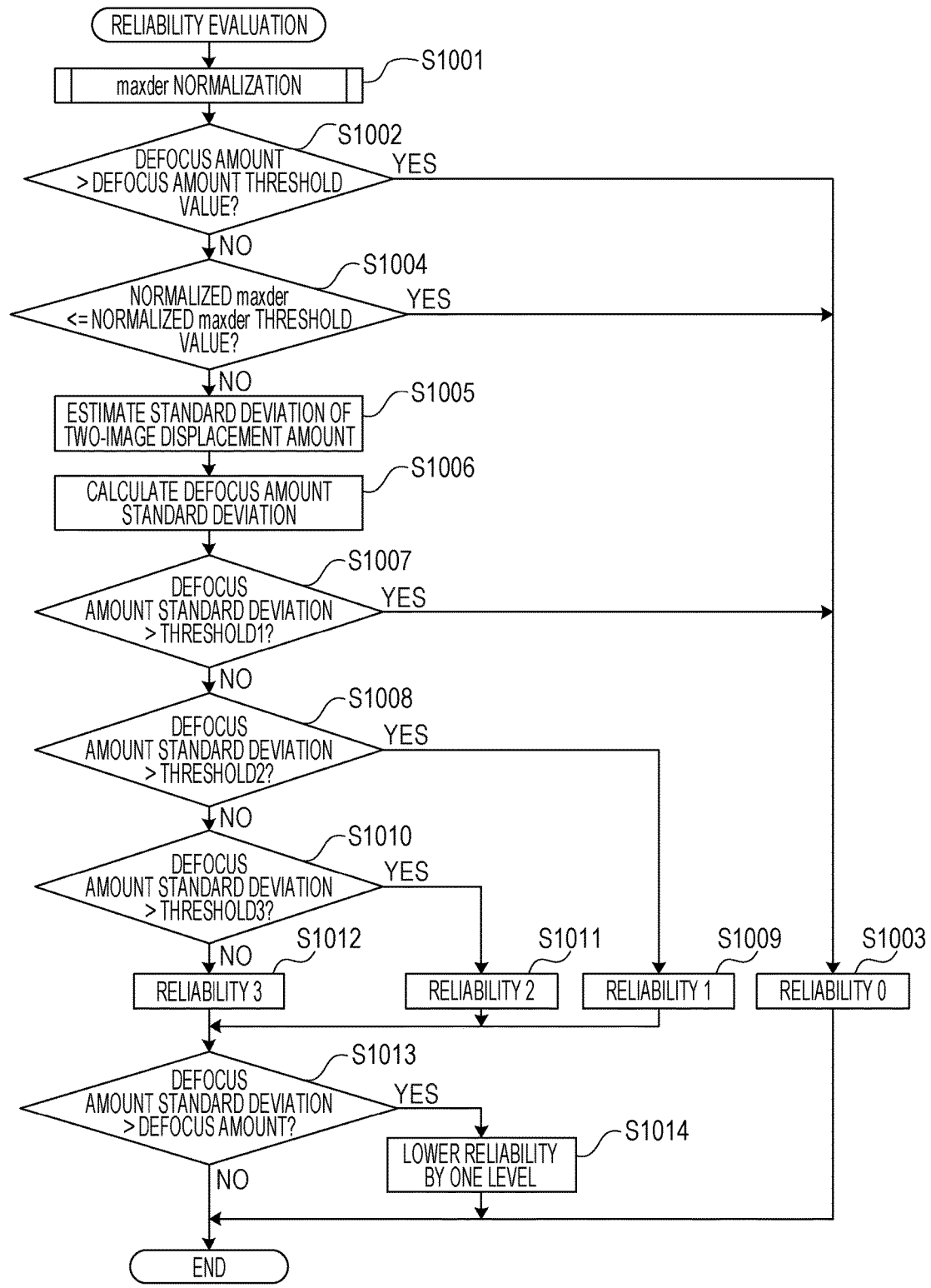
FIG. 10 is a flowchart illustrating an example of a reliability evaluation.

Firstly, with reference to FIG. 10, a flow of the reliability evaluation process will be described. FIG. 10 is a flowchart illustrating the reliability evaluation process.

In a process of a "Maxder normalization" in step S1001, the focus detecting signal processing unit 125 normalizes maxder based on a shooting condition and a subject condition (steepness normalization unit). The reason to normalize the maxder is to improve the accuracy of the reliability and the details will be described later. Then, the process proceeds to step S1002.

In a process of "Defocus amount>defocus amount threshold value?" in step S1002, the focus detecting signal processing unit 125 determines whether or not the defocus amount calculated in step S510 is greater than a set defocus amount threshold value. The defocus amount threshold value is set for each filter according to a defocus amount detection ability of each filter (a measurable limited distance regarding a total shift amount). Here, the defocus amount threshold value is set in advance and stored in the ROM 137. When the calculated defocus amount is greater than the defocus amount threshold value (in a case of "Y"), the process proceeds to S1003. When the defocus amount is equal to or lower than the defocus amount threshold value, the process proceeds to S1004.

In a case of "Reliability 0" in step S1003, the focus detecting signal processing unit 125 evaluates the reliability of the defocus amount as low and sets the reliability evaluation level as "reliability 0." Then, the reliability evaluation process ends.

In the process of "Normalized maxder<=normalized maxder threshold value?" in step S1004, the focus detecting signal processing unit 125 determines whether or not the maxder normalized in S1001 is equal to or less than the normalized maxder threshold value (equal to or lower than the steepness threshold value). When it is determined that the normalized maxder is equal to or lower than the normalized maxder threshold value, the process proceeds to step S1003. When it is determined that the normalized maxder is greater than the normalized maxder threshold value, the process proceeds to S1005. In a case that a reliability to output, which may be a detection of a focusing state when the brightness is low or a detection of a focusing state to a subject having a low contrast, is easily mistaken, the normalized maxder becomes small. Thus, a wrong reliability is prevented from being output, by setting a normalized maxder threshold value. Since maxder has different characteristics according to a filter to be used, a normalized maxder threshold value is set for every filter (for every wavelength ranges of signal components to be extracted). Here, the normalized maxder threshold value is set in advance and stored in the ROM 137.

In a process of "Standard deviation estimation of two-image displacement amount" in step S1005, the focus detecting signal processing unit 125 estimates a standard deviation (3σ) of a two-image displacement amount PRD based on the normalized maxder. Since there is a negative correlation between the normalized maxder and the standard deviation of the two-image displacement amount PRD, the standard deviation of the two-image displacement amount PRD can be estimated based on the normalized maxder. Here, a principle of the standard deviation estimation of the two-image displacement amount PRD will be described later. Then, the process proceeds to step S1006.

In a process of "Standard deviation calculation of defocus amount" in step S1006, the focus detecting signal processing unit 125 calculates a standard deviation (3σ) of a defocus amount by multiplying a predetermined conversion coefficient to the standard deviation (3σ) of the two-image displacement amount PRD. As described above, in steps S1005 and S1006, the focus detecting signal processing unit 125 converts the normalized maxder (normalized steepness) into a standard deviation (3σ) of a defocus amount (conversion unit). The conversion coefficient used here is a coefficient used to convert a length of a focus detection pixel row and a two-image displacement amount into a defocus amount. Similarly to the conversion coefficient used to calculate a defocus amount based on the two-image displacement amount PRD which is a shift amount between the A image and B image, the conversion coefficient is determined based on a coordinate to set the aperture value of the diaphragm 113, the exit pupil distance of the lens, the individual information of the image pickup element 121, and the focus detection area 602. The conversion coefficient is set in advance and stored in the ROM 137.

Then, in step S1006, the focus detecting signal processing unit 125 performs normalization by dividing the standard deviation (3σ) of the defocus amount with an aperture value F and an allowance scattering circle δ (standard deviation normalization unit). For example, the standard deviation (3σ) of the normalized defocus amount is calculated by (standard deviation (3σ) of two-image displacement amount PRD)×(conversion coefficient (mm/bit)))/(((aperture value (F value))×(allowance scattering circle δ)). As described above, the standard deviation (3σ) of the defocus amount can be normalized by multiplying the standard deviation of the defocus amount with a predetermined conversion coefficient and dividing with an aperture value and an allowance scattering circle. Here, the reliability may be evaluating by setting a threshold value for each Fδ (aperture value× allowance scattering circle) instead of normalizing by using Fδ.

According to the embodiment of the present invention, the reliability is evaluated based on a normalized defocus amount standard deviation; however, the reliability of the displacement amount of two images may be evaluated based on a normalized maxder. In such a case, a threshold value that gives each reliability is set for each conversion coefficient used to convert a two-image displacement amount PRD into a defocus amount. Further, in step S1006, it is preferable to set a threshold value for each pair of a conversion coefficient and Fδ, as considering that the defocus amount, which is acquired from the normalized maxder, is further normalized by using Fδ (the aperture value×the allowance scattering circle). The threshold value may be set for a normalized maxder or may be set for the normalized standard deviation of the displacement amount of the two images (PRDPRD3σ_st proportional to the normalized maxder). Here, the threshold value of each conversion coefficient in such a case may be stored in the ROM 137 in advance.

With a configuration to evaluate the reliability of the displacement amount of the two images (the defocus amount standard deviation (3σ)) based on the normalized maxder, a number of threshold values as many as a number of conversion coefficients or a number of pairs of conversion coefficient and Fδ. On the other hand, it is preferable to evaluate the reliability of the defocus amount based on a normalized defocus amount standard deviation as described in the embodiment of the present invention, since a preferable threshold value may be set without storing a large amount of threshold value data in the ROM 137. Further, since normalization is performed by using an aperture value F, a threshold value can be set regardless of the state of the diaphragm 113. Here, the defocus amount is calculated by multiplying a two-image displacement amount PRD with a conversion coefficient. Thus, in the embodiment of the present invention, the reliability of the displacement amount PRD of the two images is not only the reliability of the displacement amount PRD of the two images and also includes a reliability of a defocus amount.

As described above, the focus detecting signal processing unit 125 evaluates the reliability of the defocus amount corresponding to the calculated defocus amount standard deviation (3σ). Thus, according to the embodiment of the present invention, three different threshold values are set for a defocus amount standard deviation (3σ). According to the embodiment of the present invention, a first standard deviation threshold value, a second standard deviation threshold value, and a third standard deviation threshold value are set in descending order of values. Hereinafter, the first standard deviation threshold value is referred to as THRESHOLD1, the second standard deviation threshold value is referred to as THRESHOLD2, and the third standard deviation threshold value is referred to as THRESHOLD3.

The process of "Defocus amount standard deviation>THRESHOLD1?" in S1007, the focus detecting signal processing unit 125 determines whether or not the defocus amount standard deviation is greater than THRESHOLD1. When greater (in a case of "Y"), the process proceeds to S1003. In such a case, as described above, the reliability evaluation level of the defocus amount is determined as "Reliability 0." When the defocus amount standard deviation (3σ) is equal to or lower than THRESHOLD1 (equal to or lower than the first standard deviation threshold value) (in a case of "N"), the process proceeds to step S1008.

In a process of "Defocus amount standard deviation>THRESHOLD2?" in step S1008, the focus detecting signal processing unit 125 determines whether the defocus amount standard deviation is greater than THRESHOLD2. When it is determined to be greater (in a case of "Y"), the process proceeds to step S1009. The case that the process proceeds to step S1009 is a case that the defocus amount standard deviation (3σ) is equal to or lower than THRESHOLD1 (equal to or lower than the first standard deviation threshold value) and greater than THRESHOLD2. In such a case, the focus detecting signal processing unit 125 sets the reliability evaluation level as "Reliability 1." When it is determined that the defocus amount standard deviation (3σ) is equal to or lower than THRESHOLD2 (equal to or lower than the second standard deviation threshold value), the process proceeds to step S1010.

In a process of "Defocus amount standard deviation>THRESHOLD3?" in step S1010, the focus detecting signal processing unit 125 determines whether or not the defocus amount standard deviation is greater than THRESHOLD3. When it is determined to be greater (in a case of "Y"), the process proceeds to step S1011. The case that the process proceeds to step S1011 is a case that the defocus amount standard deviation (3σ) is equal to or lower than THRESHOLD2 (equal to or lower than the second standard deviation threshold value) and greater than THRESHOLD3. In this case, the focus detecting signal processing unit 125 evaluates the reliability evaluation level as "Reliability 2." Then, the process proceeds to step S1013. When it is determined that the defocus amount standard deviation is equal to or lower than THRESHOLD3 (equal to or lower than the third standard deviation threshold value), the process proceeds to step S1012. In this case, in step S1012, the focus detecting signal processing unit 125 evaluates the reliability evaluation level as "Reliability 3." Then, the process proceeds to step S1013.

Steps S1013 and S1014 are processes for a direction reversal preventive measure. A direction reversal means to drive the focusing lens 114 in an opposite direction from a proper focusing position. When a direction reversal occurs, the subject image is defocused and a user (operator) may feel uncomfortable when shooting a moving image. Then, after the reliability evaluation, the direction reversal preventive measure to prevent the direction reversal is executed.

Concretely, in step S1013, the focus detecting signal processing unit 125 compares a defocus amount standard deviation (3σ) with a defocus amount, and determines whether or not the defocus amount standard deviation (3σ) is greater than the defocus amount. Then, when the defocus amount standard deviation (3σ) is greater than the defocus amount (in a case of "Y"), the process proceeds to step S1014. If not, the reliability evaluation process is ended.

In step S1014, the focus detecting signal processing unit 125 lowers the level of reliability evaluated in any one of steps S1012, S1011, and S1009 by one level. Then, the reliability evaluation process ends.

Figure 11A:
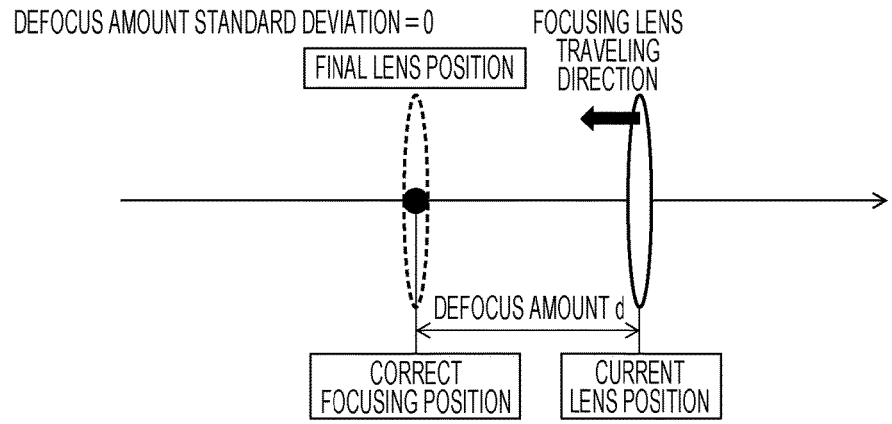
FIGS. 11A, 11B, and 11C are diagrams illustrating a defocus amount and a drive direction of a focusing lens.
Figure 11B:
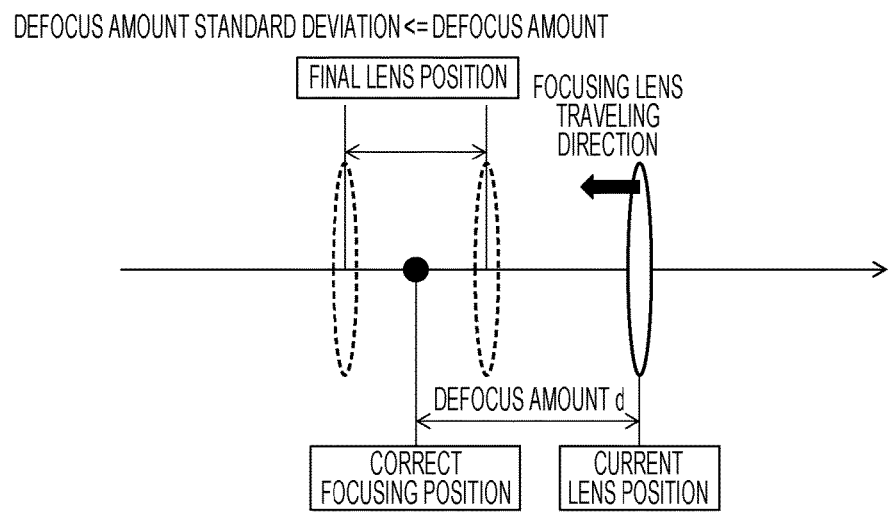
Figure 11C:
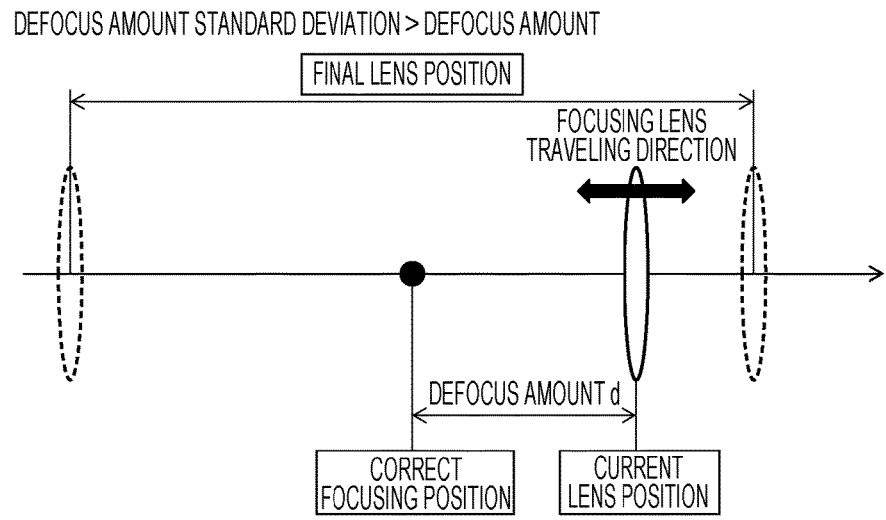

Here, the principle of the direction reversal preventive measure in steps S1013 and S1014 will be described with reference to FIGS. 11A to 11C. FIG. 11A illustrates a case where defocus amount standard deviation=0. In this case, since the defocus amount is accurate, the focusing lens 114 is driven toward a correct focusing position and stopped at the correct focusing position. FIG. 11B illustrates a case where the defocus amount standard deviation (3σ) is equal to or lower than the defocus amount. In this case, since there is a detection error in a defocus amount, there is a variation in a place where the focusing lens 114 may stop at last and the focusing lens 114 is driven toward the correct focusing position. FIG. 11C is a diagram illustrating a case that the defocus amount standard deviation (3σ) is greater than the defocus amount. Similarly to FIG. 11B, there is variation in the final focusing lens position and the variation is wide. Thus, the focusing lens 114 may be driven to an opposite direction with respect to the correct focusing position. Thus, according to the embodiment of the present invention, the possibility of the direction reversal is reduced by lowering the reliability by one level when the defocus amount standard deviation (3σ) is greater than the defocus amount.

The above description is a basic process flow of the reliability evaluation method. Here, the reliability evaluation method is not limited to the above process. For example, the reliability evaluation method may be changed according to the roles of the three filters. FIG. 12 is a table illustrating an example of evaluation values which can be output from each filter. The symbol "○" in the table represents a reliability which can be output. The symbol "×" represents a reliability which is not output. Since the low frequency band filter has a low accuracy, Reliability 3, which means that the focusing is available is not output. Further, since the high frequency band filter has a small total shift amount and cannot detect a focusing state from a way-out-of-focus subject, Reliability 1 is not output. These processes reduce the possibility that a wrong reliability is output.

Figure 13A:
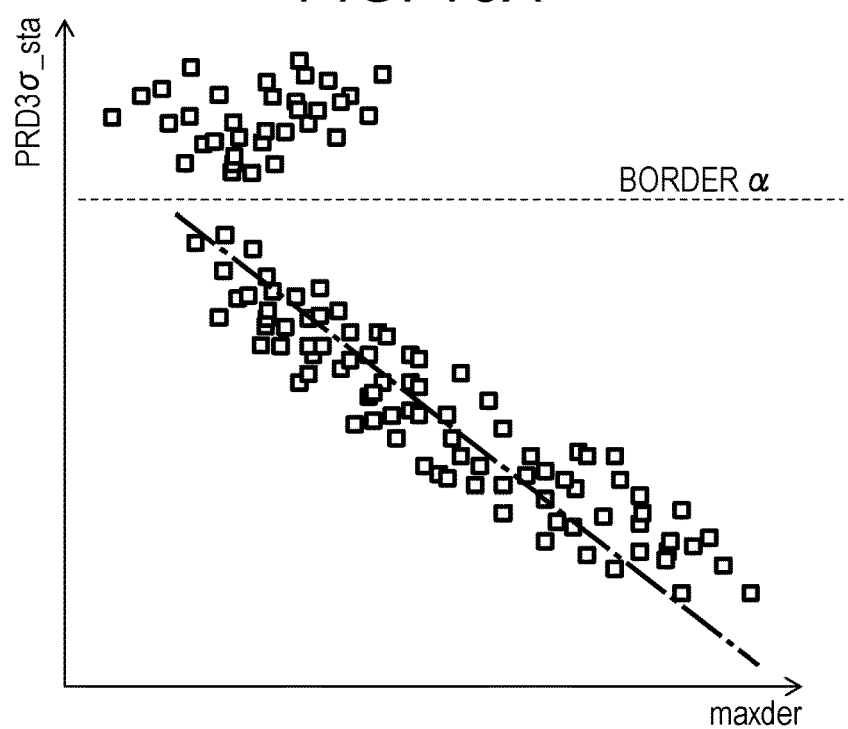
FIGS. 13A and 13B are charts illustrating examples of a relationship between maxder and two-image displacement amount standard deviations.

Next, a principle to estimate a standard deviation (3σ) of a two-image displacement amount PRD from a normalized maxder will be described. FIG. 13A is a chart illustrating a correlation between maxder and two-image displacement amount PRD standard deviations (3σ). As seen in following Expression 7, the vertical axis is a result of statistically calculating a standard deviation (PRD3σ_sta) of the two-image displacement amount PRD when the detection of a focusing state is performed N times. FIG. 13A illustrates using a logarithmic scale.

[Expression 7]

$$PRD3\sigma\_sta = \sqrt{\frac{1}{N}\sum_{i=1}^{N}(PRD_i - \overline{PRD})^2} \qquad (7)$$

The horizontal axis illustrates maxder average values when the detection of a focusing state is performed N times and illustrates with a logarithmic scale, similarly to the vertical axis. Here, the plot points in FIG. 13A use results of a case that the detection of a focusing state is performed N times in same conditions of the environment, subject, and detection of a focusing state setting (a sensor gain, an aperture value, a position of the focusing lens 114, or the like). Referring to FIG. 13A, it can be seen that there is the negative correlation in a region where the PRD3σ_sta is smaller than the border α. The details of a region where the PRD3σ_sta is greater than the border α will be described later. The PRD3σ_sta can be estimated from the maxder by using the correlation in the area where the PRD3σ_sta is smaller than the border α. Here, since the relation between the maxder and PRD3σ_sta differs a little due to the distance measurement setting and the subject, a strong negative correlation between the maxder and the PRD3σ_sta is not obtained and the estimation accuracy of the PRD3σ_sta becomes low. Thus, as described in the process of step S1001, the correlation coefficient between the maxder and PRD3σ_sta is made closer to −1 by normalizing the maxder according to the subject or detection of a focusing state setting.

Figure 14:
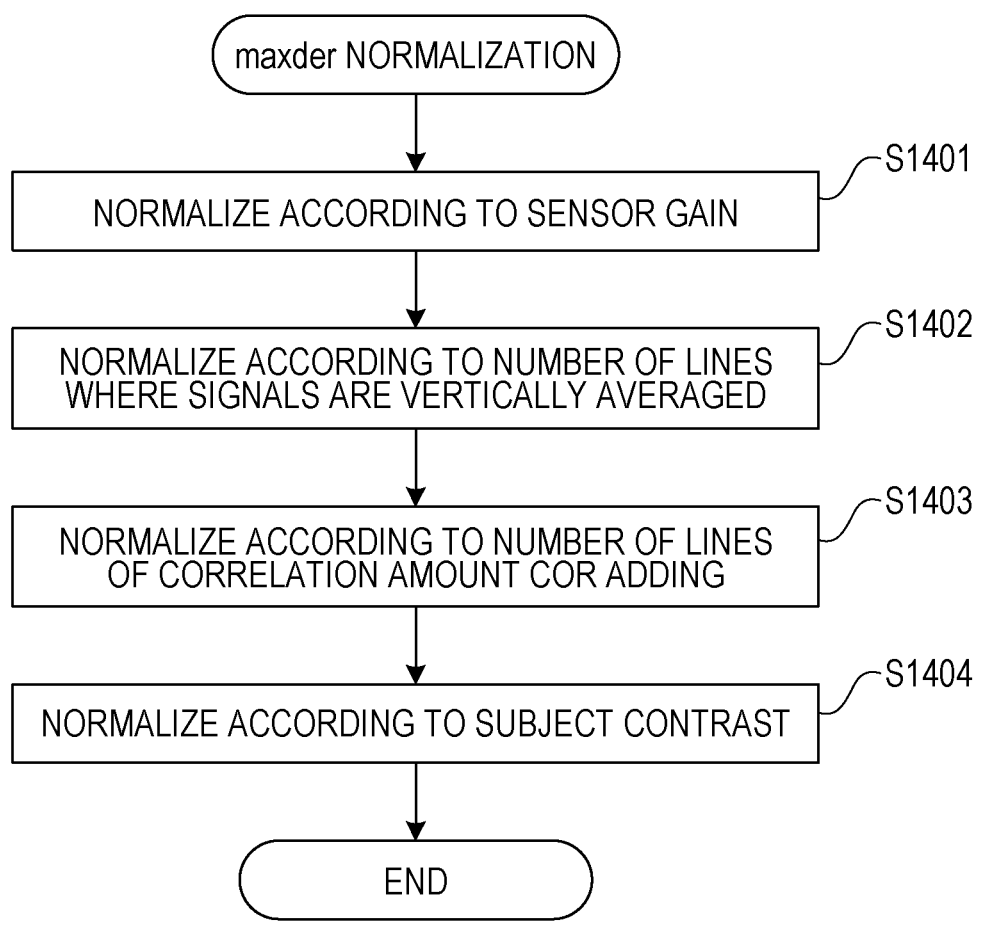
FIG. 14 is a flowchart illustrating an example of a maxder normalization.

Here, the concrete maxder normalization method will be described with reference to the flowchart of FIG. 14. According to the embodiment of the present invention, as the condition of the subject and the detection of a focusing state setting used in the maxder normalization, the following four conditions are used. Here, the conditions of the subject and detection of a focusing state setting used in the maxder normalization are not limited to the following four conditions. The maxder may be normalized according to other conditions. Further, the flowchart of FIG. 14 illustrates an example of the process of normalization by using the following four conditions; however, normalization may be performed by using a part of the conditions.
(i) Sensor gain (S1401)
(ii) Number of lines of vertical line averaging (S1402)
(iii) Number of adding lines of correlation amount COR (S1403)
(iv) Subject contrast value (S1404)

Figure 15:
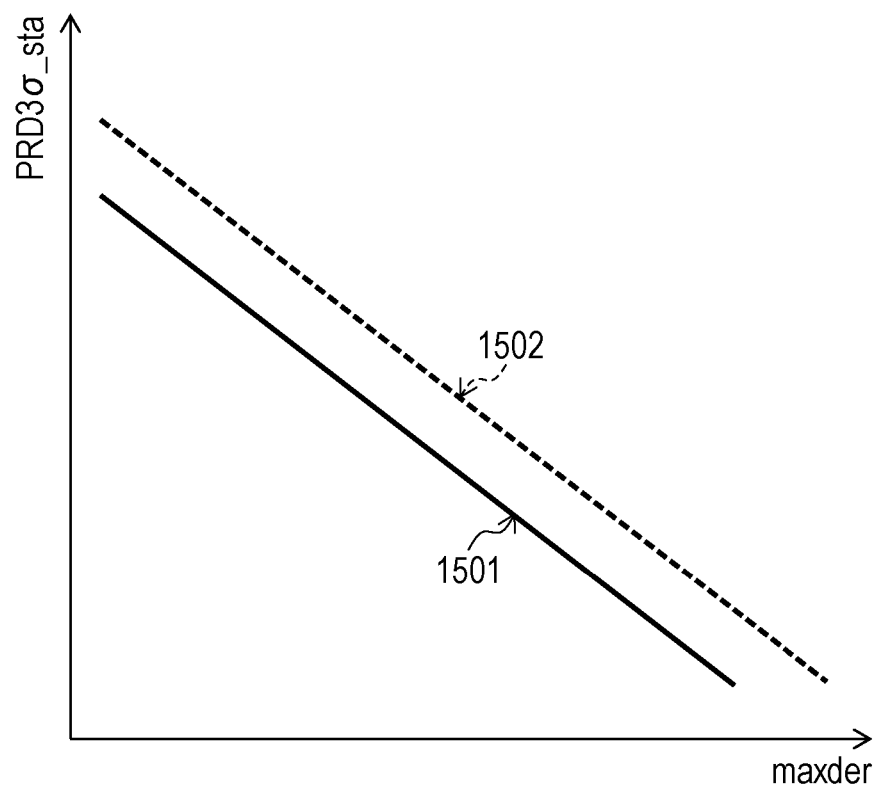
FIG. 15 is a chart illustrating an example of relationship between maxder and an approximate line of two-image displacement amount standard deviations.

In step S1401, the focus detecting signal processing unit 125 performs normalization according to (i) Sensor gain (ISO sensitivity). In other words, the focus detecting signal processing unit 125 normalizes the maxder according to a sensor gain (ISO sensitivity) set by the CDS/AGC/AD circuit 123 or a sensor gain set by the user. When the sensor gain is made higher, since a signal value as well as a signal noise are increased, the detection variation of the two-image displacement amount PRD in the correlation calculation may be increased. FIG. 15 is a chart using an axis similar to that of FIGS. 13A and 13B and illustrates an approximate line that plots data of two conditions. FIG. 15 illustrates a relation illustrated by the continuous line 1501 when the sensor gain is small and a relation illustrated by the broken line 1502 when the sensor gain is large. The maxder is normalized by following Expression 8 by using a coefficient $a_{gain}$ which is determined according to the sensor gain to cancel the difference. Here, the coefficient $a_{gain}$ is set in advance and stored in the ROM 137.

[Expression 8]

$$\text{norm\_maxder}_{gain} = \text{maxder} \times a_{gain} \quad (8)$$

In step S1402, the focus detecting signal processing unit 125 performs normalization according to (ii) Number of lines of vertical line averaging. In this process, the focus detecting signal processing unit 125 normalizes the maxder according to the value set in the vertical line averaging in step S503. When the number of lines of vertical line averaging is increased as described above, since the effect of a signal noise can be reduced, the detection variation of the two-image displacement amount PRD in the correlation calculation is reduced. Thus, the case that the number of lines of the vertical line averaging in FIG. 15 is large is represented by the continuous line 1501, and the case that the number of lines is small is represented by the broken line 1502. Thus, the maxder can be normalized based on following Expression 9 using the number of lines nLine of the vertical line averaging and the coefficients $a_{line}$ and $b_{line}$. Here, these coefficients $a_{line}$ and $b_{line}$ are set in advance and stored in the ROM 137.

[Expression 9]

$$\text{norm\_maxder}_{line} = \text{maxder} \times (a_{line} \times n\text{Line} + b_{line}) \quad (9)$$

In step S1403, the focus detecting signal processing unit 125 performs normalization according to (iii) Number of adding lines of correlation amount COR. In this process, the maxder is normalized according to the set value of addition of the correlation amounts COR in step S507. When the number of adding lines of the correlation amount COR is large, the correlation change amount ΔCOR also becomes large and the value of maxder also becomes large. Thus, in FIG. 15, the case that the number of adding lines of the correlation amount COR is large is represented by the continuous line 1501, and the case that the number of adding lines is large is represented by the broken line 1502. Thus, the maxder can be normalized based on following Expression 10 using the number of lines nCOR in addition of the correlation amounts COR and the coefficients $a_{cor}$ and $b_{cor}$. Here, these coefficients $a_{cor}$ and $b_{cor}$ are set in advance and stored in the ROM 137.

[Expression 10]

$$\text{norm\_maxder}_{cor} = \text{maxder} \times (a_{cor} \times n\text{COR} + b_{cor}) \quad (10)$$

In step S1404, the focus detecting signal processing unit 125 performs normalization according to (iv) Subject contrast value CNT. More specifically, the focus detecting signal processing unit 125 normalizes the maxder according to the subject contrast value CNT calculated in step S504. It is known that, when the contrast of the subject is low, the detection variation of the two-image displacement amount PRD in the correlation calculation reduces. Thus, in FIG. 15, the case that the subject contrast value CNT is high is represented by the relation illustrated as the continuous line 1501, and the case that subject contrast value CNT is low is represented by the relation illustrated as the broken line 1502. Thus, the maxder can be normalized based on Expression 11 using the subject contrast value CNT and the coefficients $a_{cnt}$ and $b_{cnt}$. Here, these coefficients $a_{cnt}$ and $b_{cnt}$ are set in advance and stored in the ROM 137.

[Expression 11]

$$\text{norm\_maxder}_{cnt} = \text{maxder} \times (a_{cnt} \times \text{CNT} + b_{cnt}) \quad (11)$$

Figure 13B:
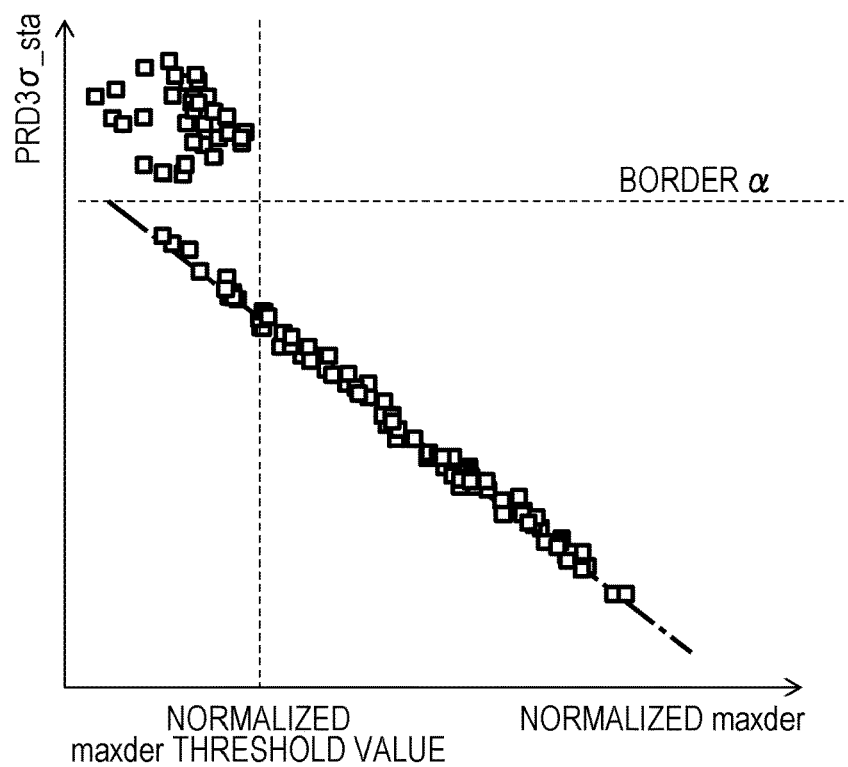

Here, as described above, the coefficients used in the maxder normalization calculation according to the four conditions are prepared in advance according to the three types of filters. FIG. 13B illustrates the relation between the normalized maxder and PRD3σ_sta after the above described maxder normalization is performed. It can be seen that, compared with the chart of FIG. 13A, the chart of FIG. 13B has a strong negative correlation. Thus, the standard deviation PRD3σ_est of the two-image displacement amount PRD can be calculated (estimated) by preparing following Expression 12 by using the coefficients a and b calculated based on the norm_maxder, which is maxder normalized according to the above described four conditions and the previously measured data.

[Expression 12]

$$\text{PRD3}\sigma\_\text{est} = a \times \text{norm\_maxder}^b \quad (12)$$

Next, a region where the standard deviation PRD3σ_sta of the two-image displacement amount PRD becomes greater than the border α will be described. This region is a region where the standard deviation PRD3σ_sta of the two-image displacement amount PRD is large and the reliability of the defocus amount becomes low. Thus, the reliabilities of the environment, subject, and detection of a focusing state setting plotted in this region are preferable to be unavailable. Thus, according to the embodiment, the reliability in the region where the standard deviation PRD3σ_sta becomes greater than the border α is made unavailable by setting the normalized maxder threshold value set in S1004 as illustrated in FIG. 13B. Here, the method to lower the reliability in the region is not limited to the method for setting the maxder threshold value as illustrated in FIG. 13B. For example, a method for evaluating the reliability lower according to other evaluation values in the correlation calculation may be used.

As described above, the focus detecting signal processing unit 125 of the image pickup apparatus 101 according to the embodiment of the present invention calculates (estimates) a standard deviation of a defocus amount based on the maxder output based on one-time detection of a focusing state and evaluates the reliability of the defocus amount. When the defocus amount detection variation is calculated by actually detecting a focusing state more than one time, it becomes difficult to calculate the variation of the defocus amount since the detection of a focusing state result changes if the subject is moving. However, as described in the embodiment of the present invention, the defocus amount standard deviation can be calculated even when the subject moves by calculating the defocus amount standard deviation based on the maxder. Further, in this case, when the maxder is normalized according to the detection of a focusing state setting or the subject, since the accuracy of the reliability of the defocus amount can be improved, a threshold value for more detailed reliability evaluation can be set. Then, by evaluating the defocus amount reliability in this manner, a more stable AF control can be performed.

Further, the embodiment of the present invention describes an example to normalize a steepness based on a sensor gain (ISO sensitivity), a number of lines of vertical line adding, a number of COR line adding, and a subject contrast, respectively. Here, as described above, the conditions of the subject or detection of a focusing state setting used in the maxder normalization are not limited to the four conditions. Further, the normalization may be performed by using only a part of the four conditions. For example, in a case of a device configuration that cannot select the sensor gain, normalization according to the sensor gain is not needed. Similarly, the number of lines in vertical line adding and the number of COR line adding, the normalization according to these is not needed in an embodiment that does not change the number of adding. Further, in an embodiment that changes the number of adding, it may be determined whether the normalization according to the number of lines of vertical line adding and the number of COR line adding based on the brightness of the acquired signal. For example, a threshold value may be set to a value that can determine whether or not image capturing can be performed with a so called low brightness condition so that an embodiment that performs normalization only when the brightness is equal to or lower than the threshold value, or an embodiment that performs normalization only when the brightness is equal to or greater than the threshold value, in contrast, may be employed.

According to the above described embodiment, the accuracy of the reliability evaluation can be improved and a stable AF control can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2016-179909, filed Sep. 14, 2016, which is hereby incorporated by reference herein in its entirety.

What is claimed is:

1. A focus adjustment apparatus comprising:
a signal generating unit configured to generate signals of two images respectively corresponding to a pair of light fluxes that pass through different pupil regions of a focusing lens;
a two-image displacement amount calculating unit configured to calculate a displacement amount of the two images with respect to each other based on a phase difference of the signals of the two images;
a steepness calculating unit configured to calculate a steepness of change in a correlation change amount of the two images;
a steepness normalizing unit configured to normalize the steepness; and
an evaluating unit configured to evaluate reliability of the displacement amount of the two images based on the normalized steepness.

2. The focus adjustment apparatus according to claim 1, further comprising:
a defocus amount calculating unit configured to calculate a defocus amount based on the displacement amount of the two images; and
a converting unit configured to convert the normalized steepness into a standard deviation of the defocus amount,
wherein the evaluating unit evaluates reliability of the displacement amount of the two images by evaluating reliability of the defocus amount calculated by the defocus amount calculating unit based on the standard deviation of the defocus amount.

3. The focus adjustment apparatus according to claim 2, wherein
the defocus amount calculating unit includes one or more filters for extracting a signal component in a predetermined frequency band for the respective signals of the two images, and
calculates the defocus amount from the extracted signal component in the predetermined frequency band for the respective signals of the two images.

4. The focus adjustment apparatus according to claim 3, wherein
a coefficient used by the steepness normalizing unit to calculate for normalization of the steepness is set according to the frequency band of the signal component extracted by the filter.

5. The focus adjustment apparatus according to claim 1, wherein
the signal generating unit further includes an image pickup element, and
the steepness normalizing unit normalizes the steepness according to a sensor gain of the image pickup element.

6. The focus adjustment apparatus according to claim 1, further comprising
an adding/averaging unit configured to add and average the respective signals of the two images,
wherein the steepness normalizing unit normalizes the steepness according to a number of lines that the adding/averaging unit adds and averages from the respective signals of the two images.

7. The focus adjustment apparatus according to claim 1, further comprising
a correlation change amount adding unit configured to add waveforms of a correlation amount of the signals of the two images,
wherein the steepness normalizing unit normalizes the steepness according to an adding number used by the correlation change amount adding unit to add the waveforms of the correlation amount of the signals of the two images.

8. The focus adjustment apparatus according to claim 1, wherein
the steepness normalizing unit normalizes the steepness according to a contrast value that indicates contrast of a subject.

9. The focus adjustment apparatus according to claim 8, wherein
the contrast value is a value calculated by dividing a difference between a maximum value and a minimum value of outputs of adding and averaging the signals of the two-images by the maximum value.

10. The focus adjustment apparatus according to claim 2, wherein
the standard deviation of the defocus amount includes, in descending order, a first standard deviation threshold value, a second standard deviation threshold value, and a third standard deviation threshold value, and
the evaluating unit
evaluates a level of the reliability as a zero level, which means that the defocus amount calculated by the defocus amount calculating unit is not reliable, when the standard deviation of the defocus amount is greater than the first standard deviation threshold value,
evaluates the level of the reliability as a first level, which means that the defocus amount calculated by the defocus amount calculating unit is not reliable but a detected defocus direction is reliable, when the standard deviation of the defocus amount is equal to or lower than the first standard deviation threshold value and greater than the second standard deviation threshold value,
evaluates a level of the reliability as a second level, which means that the defocus amount calculated by the defocus amount calculating unit is reliable, when the standard deviation of the defocus amount is equal to or lower than the second standard deviation threshold value and greater than the third standard deviation threshold value, and
evaluates a level of the reliability as a third level, which means that the defocus amount calculated by the defocus amount calculating unit is reliable and the focusing lens can be made in focus, when the standard deviation of the defocus amount is equal to or lower than the third standard deviation threshold value.

11. The focus adjustment apparatus according to claim 2, wherein
the evaluating unit evaluates that the defocus amount calculated by the defocus amount calculating unit is not reliable, when the defocus amount calculated by the defocus amount calculating unit is greater than a predetermined defocus amount threshold value.

12. The focus adjustment apparatus according to claim 1, wherein
the evaluating unit evaluates that the displacement amount of the two images calculated by the two-image displacement amount calculating unit is not reliable, when the normalized steepness is equal to or lower than a predetermined steepness threshold value.

13. The focus adjustment apparatus according to claim 1, wherein
the evaluating unit evaluates that the displacement amount of the two images calculated by the two-image displacement amount calculating unit is not reliable, when the standard deviation of the displacement amount of the two images is greater than the displacement amount of the two images.

14. The focus adjustment apparatus according to claim 10, wherein
the evaluating unit lowers the level of the reliability of the displacement amount of the two images to be lower than the level of the displacement amount of the two images evaluated according to the standard deviation, when the standard deviation of the displacement amount of the two images is greater than the displacement amount of the two images.

15. The focus adjustment apparatus according to claim 1, further comprising
a focusing lens driving unit configured to drive a focusing lens,
wherein the focusing lens driving unit fixes a drive amount of the focusing lens when it is evaluated that the displacement amount of the two images calculated by the evaluating unit is not reliable, and drives the focusing lens according to the displacement amount of the two images when it is evaluated that the displacement amount of the two images is reliable.

16. The focus adjustment apparatus according to claim 2, further comprising
a standard deviation normalizing unit configured to normalize the defocus amount and the standard deviation of the defocus amount,
wherein the evaluating unit evaluates the reliability of the defocus amount according to the standard deviation normalized by the standard deviation normalizing unit.

17. A focus adjustment method comprising:
generating signals of two images respectively corresponding to a pair of light fluxes passing though different pupil regions of a focusing lens;
calculating a displacement amount of the two images with respect to each other based on a phase difference of the signals of the two images;
calculating a steepness of change in a correlation change amount of the two images;
normalizing the steepness; and
evaluating reliability of the displacement amount of the two images based on the normalized steepness.

18. A computer-readable recording medium storing a program to cause a computer to execute the focus adjustment method according to claim 17.

* * * * *